US011483909B2

United States Patent
Tagliavia et al.

(10) Patent No.: US 11,483,909 B2
(45) Date of Patent: Oct. 25, 2022

(54) CURRENT SUPPLY SYSTEM, RELATED INTEGRATED CIRCUIT, POWER SUPPLY SYSTEM AND METHOD OF OPERATING A CURRENT SUPPLY SYSTEM

(71) Applicants: STMicroelectronics S.r.l., Agrate Brianza (IT); STMicroelectronics Application GmbH, Ascheim-Dornach (DE); STMicroelectronics Design and Application S.R.O., Prague (CZ)

(72) Inventors: Donato Tagliavia, Acireale (IT); Vincenzo Polisi, Catania (IT); Calogero Andrea Trecarichi, Gela (IT); Francesco Nino Mammoliti, Riposto (IT); Jochen Barthel, Schechen (DE); Ludek Beran, Strancice (CZ)

(73) Assignees: STMicroelectronics S.r.l., Agrate Brianza (IT); STMicroelectronics Application GmbH, Aschheim-Dornach (DE); STMicroelectronics Design and Application S.R.O., Prague (CZ)

( * ) Notice: Subject to any disclaimer, the term of this patent is extended or adjusted under 35 U.S.C. 154(b) by 0 days.

(21) Appl. No.: 17/523,641

(22) Filed: Nov. 10, 2021

(65) Prior Publication Data

US 2022/0159807 A1 May 19, 2022

(30) Foreign Application Priority Data

Nov. 17, 2020 (IT) ........................ 102020000027504

(51) Int. Cl.
*H05B 45/10* (2020.01)
*H05B 45/38* (2020.01)
(Continued)

(52) U.S. Cl.
CPC ............. *H05B 45/46* (2020.01); *H05B 45/38* (2020.01); *H05B 45/375* (2020.01)

(58) Field of Classification Search
CPC ........ H05B 45/10; H05B 45/30; H05B 45/37; H05B 45/375; H05B 45/38; H05B 45/46; H05B 45/48; H05B 47/10
See application file for complete search history.

(56) References Cited

U.S. PATENT DOCUMENTS 8,049,439 B2 11/2011 Zhao et al.
8,791,647 B2 * 7/2014 Kesterson ............. H05B 45/38 315/291

(Continued)

FOREIGN PATENT DOCUMENTS

WO 2018236460 A1 12/2018

OTHER PUBLICATIONS

IT Search Report and Written Opinion for IT Appl. No 102020000027504 (which is the IT priority filing for the instant US filing), dated Aug. 4, 2021 (8 pages).

*Primary Examiner* — Jimmy T Vu
(74) *Attorney, Agent, or Firm* — Crowe & Dunlevy

(57) ABSTRACT

A control circuit for a voltage source generates a reference signal for a voltage source, wherein the reference signal indicates a requested output voltage to be generated by the voltage source. A digital feed-forward control circuit computes a digital feed-forward regulation value indicative of a requested output voltage by determining a maximum voltage drop at strings of solid-state light sources. A digital feed-back control circuit determines a minimum voltage drop for current regulators/limiters for the strings and determines a digital feed-back correction value as a function of the minimum voltage drop. The control circuit then sets the reference signal after a start-up as a function of the digital
(Continued)

feed-forward regulation value and corrects the reference signal as a function of the digital feed-back correction value.

12 Claims, 11 Drawing Sheets

(51) Int. Cl.
*H05B 45/46* (2020.01)
*H05B 45/375* (2020.01)

(56) References Cited

U.S. PATENT DOCUMENTS

| | | | | |
|---|---|---|---|---|
| 9,084,326 | B2 | 7/2015 | Guan et al. | |
| 2010/0156315 | A1* | 6/2010 | Zhao | H05B 45/10 315/294 |
| 2010/0194308 | A1 | 8/2010 | Zhao et al. | |
| 2010/0327835 | A1 | 12/2010 | Archibald | |
| 2011/0169423 | A1 | 7/2011 | Huang et al. | |

* cited by examiner

40
VOUT1
VOUT2
VOUTn
$V_{out}$
SEL
402
404
8
VOUT1_ADC
VOUT2_ADC
VOUTn_ADC
VOUT_ADC
406
8
8
8
8
EN
Select
Min
408
8
B
A
A-B
410
8
$V_{LED\_MAX}$
412
$V_{out\_req}$
8
$V_M$
Generator
414
$V_{32\_MIN}$
$V_{reg}$
DAC
418
$V_{ref}$

CURRENT SUPPLY SYSTEM, RELATED INTEGRATED CIRCUIT, POWER SUPPLY SYSTEM AND METHOD OF OPERATING A CURRENT SUPPLY SYSTEM

PRIORITY CLAIM

This application claims the priority benefit of Italian Application for Patent No. 102020000027504, filed on Nov. 17, 2020, the content of which is hereby incorporated by reference in its entirety to the maximum extent allowable by law.

TECHNICAL FIELD

Embodiments of the present disclosure relate to solutions for reducing power losses in power supply systems for light emitting diodes, or similar solid-state light sources.

BACKGROUND

Power-supply circuits, such as AC/DC or DC/DC switched mode power supplies, are well known in the art. There exist many types of electronic converters, which are mainly divided into isolated and non-isolated converters. For instance, non-isolated electronic converters are the converters of the "buck", "boost", "buck-boost", "Ćuk", "SEPIC", and "ZETA" type. Instead, isolated converters are, for instance, converters of the "flyback", "forward", "half-bridge", and "full-bridge" type. Such types of converters are well known to the person skilled in the art, as evidenced (for example) by the application note AN513/0393 "Topologies for Switched Mode Power Supplies", L. Wuidart, 1999, STMicroelectronics (incorporated herein by reference).

FIG. 1 is a schematic illustration of a DC/DC electronic converter 20. In particular, a generic electronic converter 20 comprises two input terminals 200*a* and 200*b* for receiving a DC voltage Vin and two output terminals 202*a* and 202*b* for supplying a DC voltage Vout. For example, the input voltage Vin may be supplied by a DC voltage source 10, such as a battery, or may be obtained from an AC voltage by means of a rectifier circuit, such as a bridge rectifier, and possibly a filtering circuit. Instead, the output voltage Vout may be used to supply a load 30.

As well-known, an electronic converter comprises one or more reactive components, such as inductances and/or capacitances, and one or more electronic switches configured to control: the current flow from the input terminals 200*a* and 200*b* to the one or more reactive components, and/or the current flow from the one or more reactive components to the output terminals 202*a* and 202*b*.

For example, FIG. 2 shows a typical electronic converter 20*a*. Specifically, the electronic converter 20*a* comprises a switching stage/circuit 28 connected between input terminals 200*a*, 200*b* and output terminal 202*a*, 202*b*. Such a switching stage 28 comprises one or more reactive components, such as one or more inductances L, such as an inductor or transformer, and/or one or more capacitors C. Moreover, the switching stage 28 comprises one or more electronic switches, such as switches Q1 and Q2, configured to control one or more currents flowing through the one or more reactive components. For example, in typical electronic converters, the one or more electronic switches are used to control a current flowing through an inductance L, such as an inductor (e.g., in case of a boost, buck or buck-boost converter) or a transformer (e.g., in case of a flyback, forward or half-bridge converter).

An electronic converter 20*a* comprises typically also a control circuit 22*a* configured to drive the switching of the one or more electronic switches in order to obtain a requested output voltage $V_{out}$.

For example, for this purpose, the electronic converter 20*a* may comprise a feedback (FBC) circuit 24, such as a voltage divider, configured to generate a feedback signal FB indicative of (and preferably proportional to) the output voltage $V_{out}$, and the control circuit 22*a* is configured to generate the drive signals for the one or more electronic switches by comparing the feedback signal FB with a reference signal, such as a reference voltage $V_{ref}$.

For example, as well known in the art, the switching stage 28 may be configured such that the current flowing through the inductance L may be controlled (via the one or more electronic switches) in a Continuous-Conduction Mode (CCM), Discontinuous-Conduction Mode (DCM) or Transition Mode (TM).

For example, in CCM, the control circuit 22*a* often drives the electronic switches of the switching stage 28 (using a driver circuit 220) with switching periods comprising two switching phases, wherein: during a first phase the current flowing through the inductance L increases; and during a second phase the current flowing through the inductance L decreases.

Conversely, in DCM, the control circuit 22*a* often drives the electronic switches of the switching stage 28 with switching periods comprising three switching phases, wherein: during a first phase the current flowing through the inductance L increases; during a second phase the current flowing through the inductance L decreases, wherein the second phase ends when the current flowing through the inductance L reaches zero; and during a third phase the current flowing through the inductance L remains zero.

For example, in DCM, the start of the third phase may be intrinsic to the converter topology (e.g., by using one or more diodes, which automatically open when the current flowing through the inductance L reaches zero) or, as shown in FIG. 2, by using a zero-current detection (ZCD) circuit 26 configured to generate a zero current signal ZC by monitoring a signal CS indicative of (and preferably proportional to) the current flowing through the inductance L.

Generally, a significant number of driving schemes are known in the art. For example, in various known-solutions, the duration of the switching cycle $T_{SW}$ may be constant and the duration of the first phase may be determined via a Proportional-Integral (PI) or Proportional-Integral-Derivative (PID) regulator configured to regulate the difference between a reference signal $V_{ref}$ and a feedback signal FB provided by the feedback circuit 24. For example, this is schematically shown via a PWM generator circuit 220 configured to generate a PWM signal DRV, which has switching cycles $T_{SW}$ (e.g., with fixed or predetermined period) wherein the signal DRV is set to a first logic level (e.g., high) for a first duration $T_{ON}$ and to a second logic level (e.g., low) for a second duration $T_{OFF}$, with $T_{SW}=T_{ON}+T_{OFF}$ (see also FIG. 3). For example, the circuit 220 may be an analog and/or digital PI or PID regulator configured to vary the switch-on duration $T_{ON}$ in order to regulate the difference between the reference signal $V_{ref}$ and the feedback signal FB to zero.

Accordingly, in the example considered, the electronic converter 20, 20*a* is a voltage source configured to provide a regulated output voltage $V_{out}$. Such voltage sources may also be used to supply constant current loads. For example, FIGS. 4A and 4B show typical situations, wherein a (regulating) voltage source 20 is used to supply a given number n of Light-Emitting Diode (LED) strings 34 connected in parallel, wherein each LED string comprises a given number N of LEDs, or similar solid-state light sources L, such as laser diodes or OLEDs (Organic Light-Emitting Diode). For example, in FIGS. 4A and 4B are shown 4 strings, wherein: the first string comprises five light sources L; the second string comprises four light sources L; the third string comprises three light sources L; and the fourth string comprises two light sources L.

For example, such strings 34 may be used as background illumination of LCD panels, or generally in any application wherein the current flow through each string 34 has to be controlled individually.

Moreover, as shown in FIG. 5, often the current flow through each light source L of a given string 34 may also be controlled individually. For example, for this purpose, each light source L may have connected in parallel a respective electronic switch Sw, i.e. switches SW1, . . . , SWN for the light sources L1, . . . , LN of a given string 34, wherein each electronic switch is driven via a respective drive signal Sw_ctrl1, . . . , Sw_ctrlN. Accordingly, by using also an individual control of the light sources L, the LED strings may also be used as active LED or OLED panels.

Accordingly, in many applications: the number N of solid-state light sources L of the various strings 34 may be different; and/or the number of switched-on solid-state light sources L of one or more strings 34 may vary over time.

However, this implies that the voltage drop at the various parallel-connected LED string 34 may be different from each other and/or may change over time. Moreover, the voltage drop may also vary due to production tolerances, temperature (in particular in case of OLED panels) and ageing. For this reason, LED strings are usually not directly powered via the voltage $V_{out}$ provided by the voltage source 20 but a current regulator/limiter 32 is connected in series with each LED string 34.

For example, in FIG. 4A, the positive terminal of each LED string 34 is connected (e.g., directly) to the positive output terminal 202*a* and the negative terminal of each LED string 34 is connected (e.g., directly) via a respective current regulator/limiter 32, i.e., a current sink, to the negative output terminal 202*b*. Conversely, in FIG. 4B, the negative terminal of each LED string 34 is connected (e.g., directly) to the negative output terminal 202*b* and the positive terminal of each LED string 34 is connected (e.g., directly) via a respective current regulator/limiter 32, i.e. a current source, to the positive output terminal 202*a*.

Thus, each current regulator/limiter 32 is configured to set (in case of a regulator) or limit (in case of a current limiter) the value of the current flowing through the respective LED string 34, e.g., to a value $I_1$ for the first string, a value $I_2$ for the second string, etc. For example, often each current regulator/limiter 32 is configured set the respective current as a function of a control signal CTRL, e.g.: set the respective current to zero, thereby switching off the respective LED string; or set the respective current to a given (fixed or settable) value, thereby switching on (activating) the respective LED string, wherein the luminosity of the light emitted by the respective LED string depends of the given value.

Generally, as is well-known, in this way also the color of the light emitted by the LED strings may be set by controlling the intensity of light emitted by the various light sources L.

For example, for this purpose, each current regulator/limiter 32 may be configured to switch on or off the respective LED string and/or to set the value of the respective current as a function of one or more (analog and/or digital) control signals, such as a control signal CTRL1 for the first current regulator/limiter 32, a control signal CTRL2 for the second current regulator/limiter 32, etc. Generally, apart from the issues discussed in the foregoing, also the setting of a different value of the current flowing through the LED string usually implies that the voltage drop at each lighting emitter element L may vary over time.

For example, by using Pulse-Width Modulation (PWM) signals for the control signals CTRL, the (average) intensity of the light emitted by the light sources of a given string 34 depends on the duty cycle of the respective PWM signal CTRL. Similarly, by using PWM signals for the signal Sw_ctrl1, . . . , Sw_ctrlN the (average) intensity of the light emitted by each light source of a given string 34 depends on the duty cycle of the respective PWM signal Sw_ctrl.

Thus, often the given (maximum) value of the current regulators/limiters 32 is fixed, and the luminosity of the light sources 34 is controlled via the PWM signals CTRL and/or Sw_ctrl, by switching the strings 34 and/or the individual light sources L on and off. In fact, the current regulator/limiters 32 are configured to set the value of the current flowing through each LED string 34. Moreover, optionally the various light sources of each LED string 34 may also be switched on or off individually, whereby the current may flow only through a subset of the light sources, i.e. the current regulator/limiters 32 is configured to set a global current for the respective LED string, and the additional switches may be used to deactivate the current flow through one of more of the light sources of the string.

Often the current regulator/limiters 32 are linear current regulators, which thus implies that the difference between the voltage $V_{out}$ and the voltage drop at the respective LED string is applied to current regulator/limiters 32, which substantially dissipates the excessive power, thereby generating electrical losses.

For this reason, it is usually preferably to maintain the voltage $V_{out}$ slightly above the maximum voltage drop at the LED strings. Accordingly, in case the voltage $V_{out}$ is fixed, the voltage $V_{out}$ has to be equal to (or greater than) the worst case requiring the maximum supply voltage. Conversely, also adaptive systems are known, e.g., from United States Patent Application Publication Nos. 2004/0233144 or 2010/0156315, or U.S. Pat. No. 6,864,641, all of which are incorporated by reference, wherein the value of the output voltage $V_{out}$ is varied as a function of the voltage drop at the LED strings 34 or the current regulators/limiters 32.

Such solutions usually involve a calibration phase, wherein the maximum voltage drop at the LED strings 34 is determined. For example, for this purpose, the operational function of the LED panel is periodically interrupted by the calibration procedure itself, by turning on the LED strings one at a time or turning them all on simultaneously.

However, in cases where the LEDs are used to signal dangerous situations, such as in the automotive sector, e.g., in case of rear lights, which should be able to signal a sudden braking or direction indicators, these methods represent a significant limitation of the LED system. Moreover, e.g., in case of active LED panels, the number of activated light sources of each string may vary frequently, whereby the assumption of the worse-case situation still generates significant power losses.

In view of the foregoing, there is a need in the art to provide solutions for dynamically adapting the output voltage of a voltage source based on the actual load requirements.

SUMMARY

According to one or more embodiments, a current supply system is provided. Embodiments moreover concern a related integrated circuit, power supply system and method of operating a current supply system.

Various embodiments of the present disclosure relate to a current supply system, e.g., implemented in an integrated circuit.

Specifically, in various embodiments, the current supply system comprises one or more first terminals configured to be connected to a first output terminal of a voltage source, and a plurality of second terminals, wherein each of the second terminals is configured to be connected via a respective string of solid-state light sources to a second output terminal of the voltage source.

In various embodiments, the current supply system comprises a plurality of current regulators or limiters, wherein each of the second terminals is connected via a respective current regulator or limiter to at least one of the one or more first terminals, wherein each of the current regulators or limiters is configured to limit a current flowing through a string of solid-state light sources connected to the respective second terminal to a respective maximum value. Accordingly, the current supply system may be used to limit the current flows in a power supply system comprising also the voltage source and optionally the strings of solid-state light sources.

In various embodiments, the current supply system comprises also a third terminal configured to provide a reference signal to the voltage source, wherein the reference signal is indicative of a requested output voltage to be generated by the voltage source between the first and the second output terminals of the voltage source. Accordingly, a control circuit may be configured to generate this reference signal.

Specifically, in various embodiments, the control circuit comprises at least one analog-to-digital converter and a digital-to-analog converter conversion circuit. Specifically, the at least one analog-to-digital converter is configured to obtain digital samples of the voltages at the second terminal and the voltage between the first and the second output terminals of the voltage source, i.e., the output voltage generated by the voltage source. The digital-to-analog converter conversion circuit is configured to receive a digital regulation value and provide at output the reference signal to the third terminal/the voltage source.

For example, typically the reference signal may be used to set a reference voltage of the voltage source, e.g., the reference signal may be proportional to the requested output voltage to be generated by the voltage source. In this case, the digital-to-analog converter conversion circuit may comprise an analog-to-digital converter configured to directly generate the reference signal as a function of the digital regulation value. However, the reference signal may also be used to vary a feedback signal of the voltage source. For example, in this case, the third terminal may be coupled to a feedback terminal of the voltage source in order to vary a feedback signal indicative of the output voltage generated by the voltage source.

In various embodiments, the control circuit comprises both a digital feed-forward control circuit and a digital feed-back control circuit.

In various embodiments, the feed-forward control circuit is configured to compute a digital feed-forward regulation value indicative of a requested output voltage by determining a maximum voltage drop between the second terminals and the second output terminal of the voltage source (i.e., at the strings of solid-state light sources) as a function of the digital samples and by adding a given head-room to this maximum voltage drop.

Conversely, in various embodiments, the feed-back control circuit is configured to determine a minimum voltage drop at the plurality of current regulators or limiters as a function of the digital samples and determine a feed-back correction value as a function of the difference between the minimum voltage drop and the head-room.

In various embodiments, the control circuit is configured to, in response to a start-up of the current supply system, set the digital regulation value to a first value indicative of a maximum requested output voltage, i.e., initially the voltage source provides a maximum supply voltage.

In various embodiments, the control circuit is then configured to determine whether the digital regulation value corresponds to the first (maximum) value. In this case, the control circuit sets the digital regulation value as a function of the feed-forward value, e.g., sets the digital regulation value to the feed-forward value, whereby the voltage source "jumps" from the maximum value to a new output voltage corresponding to the feed-forward value. Conversely, when the digital regulation value does not correspond to the first value (e.g., because the feed-forward value has already been used), the control circuit may add the feed-back correction value to the digital regulation value, thereby implementing a fine tuning of the output voltage.

Generally, the control circuit may also detect various events and set the digital regulation value either to a maximum value (thereby reactivating the feed-forward control) or a minimum value (thereby deactivating the current supply to the strings of solid-state light sources).

For example, in various embodiments, each of the current regulators or limiters is configured to receive from the control circuit at least one control signal indicating at least a first operating mode and a second operating mode. For example, when the at least one control signal indicates the first operating mode, the respective current regulator or limiter may be configured to deactivate the current. Conversely, when the at least one control signal indicates the second operating mode, the respective current regulator or limiter may be configured to limit the current to the respective maximum value. For example, for this purpose, the at least one control signal may comprise a Pulse-Width Modulated signal, wherein a first logic level of the Pulse-Width Modulated signal indicates the first operating mode and a second logic level of the Pulse-Width Modulated signal indicates the second operating mode. Generally, the at least one control signal may also indicate the maximum value. For example, such control signals may be used to selectively switch-on or switch-of the strings and/or to perform dimming the light emitted by the light source.

For example, in this case, the control circuit may be configured to determine, as a function of the control signals, whether all the strings of solid-state light sources should be switched off. For example, in case of PWM signals, the control circuit may determine whether the control signals indicate that all current regulators or limiters are switched off (first operating mode), for a complete PWM cycle or for a plurality of PWM cycles. In this case, the control circuit may also (substantially) deactivate the voltage source by setting the digital regulation value to a second value indicative of a minimum requested output voltage.

Additionally, the control circuit may be configured to determine, as a function of the control signals, whether at least one of the strings of solid-state light sources should be switched on (second operating mode). For example, in case of PWM signals, the control circuit may determine whether the control signals indicate that at least one current regulator or limiters should be switched on during the current PWM cycle.

Specifically, in case the output voltage was deactivated, the control circuit may resume the operation by starting a new feed-forward control action. Specifically, in response to having determined that that at least one current regulator or limiters should be switched on, the control circuit may verify whether the digital regulation value corresponds to the second (minimum) value (indicating that the output voltage has its minimum value). In this case, the control circuit may set the digital regulation value to the first (maximum) value. Accordingly, in response to setting the digital regulation value to the first (maximum) value, the voltage source will provide the maximum output voltage, and the control circuit will set (after a given time period) the digital regulation value again as a function of the feed-forward value.

In various embodiments, the control circuit may also determine whether the light sources are indeed powered. For example, for this purpose, the control circuit may determine whether the control signals indicate that at least one current regulator or limiter should use the second operating mode. In this case, the control circuit may determine whether a current is flowing through the at least one current regulator or limiter which should use the second operating mode. For example, in response to determining that no current is flowing through at least one of the current regulators or limiters which should use the second operating mode, the control circuit may vary the digital regulation value in order to increase the requested output voltage.

BRIEF DESCRIPTION OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
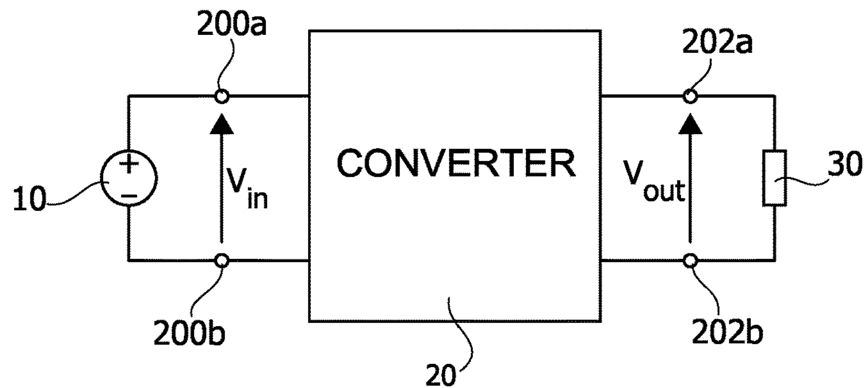
FIG. 1 shows a typical power supply system.
Figure 5:
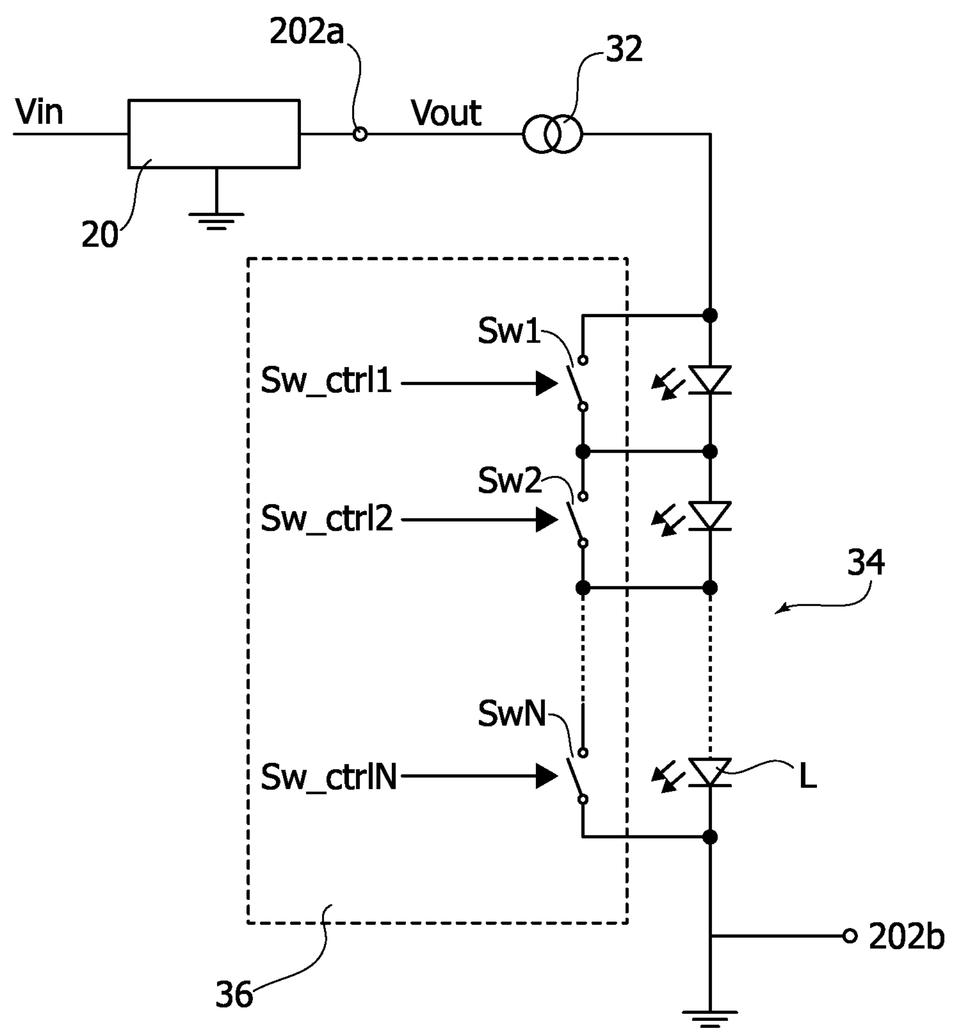

In the following FIGS. 6 to 14, it will be noted that parts, elements or components which have already been described with reference to FIGS. 1 and 5 are denoted by the same references previously used in such Figures; the description of such previously described elements will not be repeated in the following in order not to overburden the present detailed description.

Figure 4A:
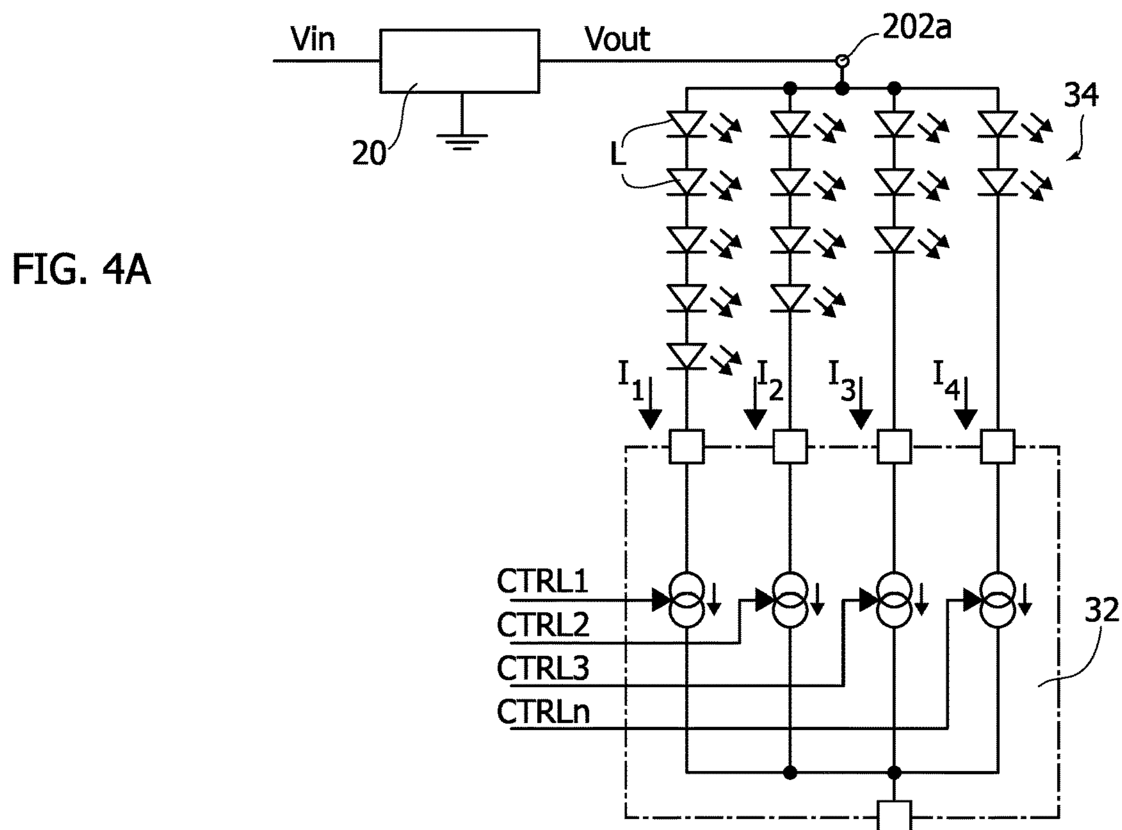
FIGS. 4A, 4B and 5 show examples of power supply systems, wherein a voltage source and a current supply system are used to power a plurality of strings of solid-state light sources.
Figure 4B:
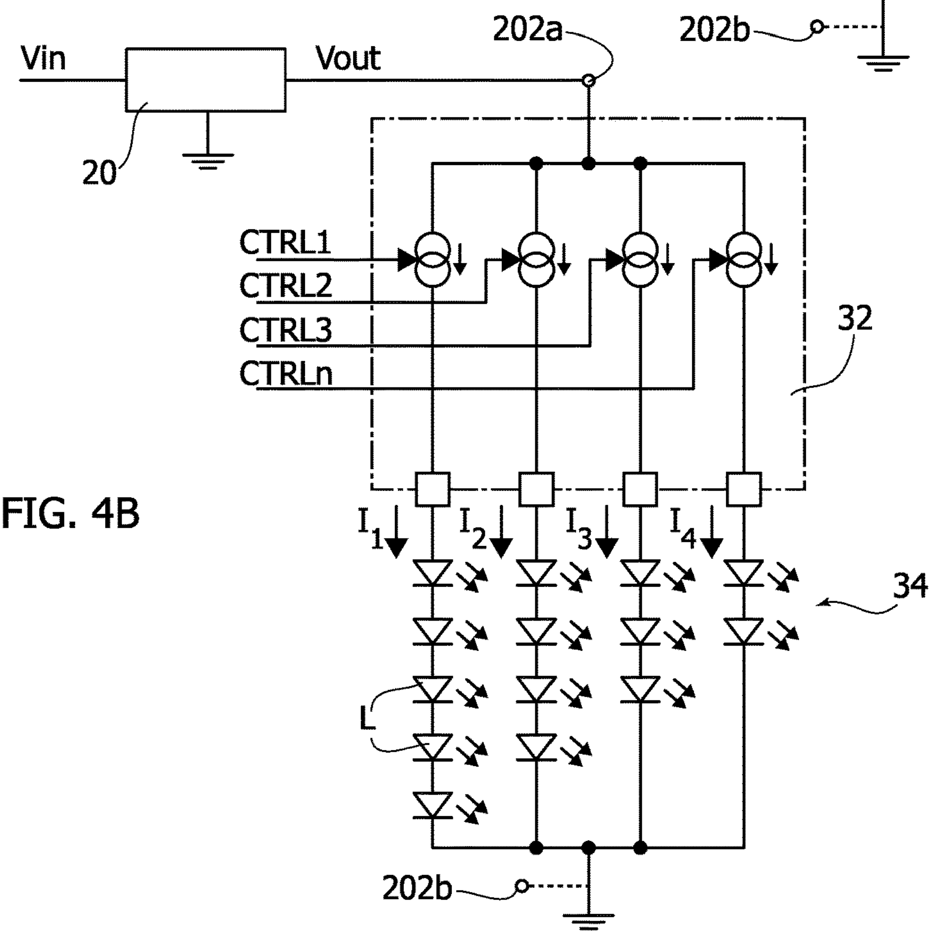

As mentioned before, the present description relates to solutions for supplying a current to a load, such as strings 34 of solid-state light sources L as described with respect to FIG. 4A, 4B or 5.

Figure 6:
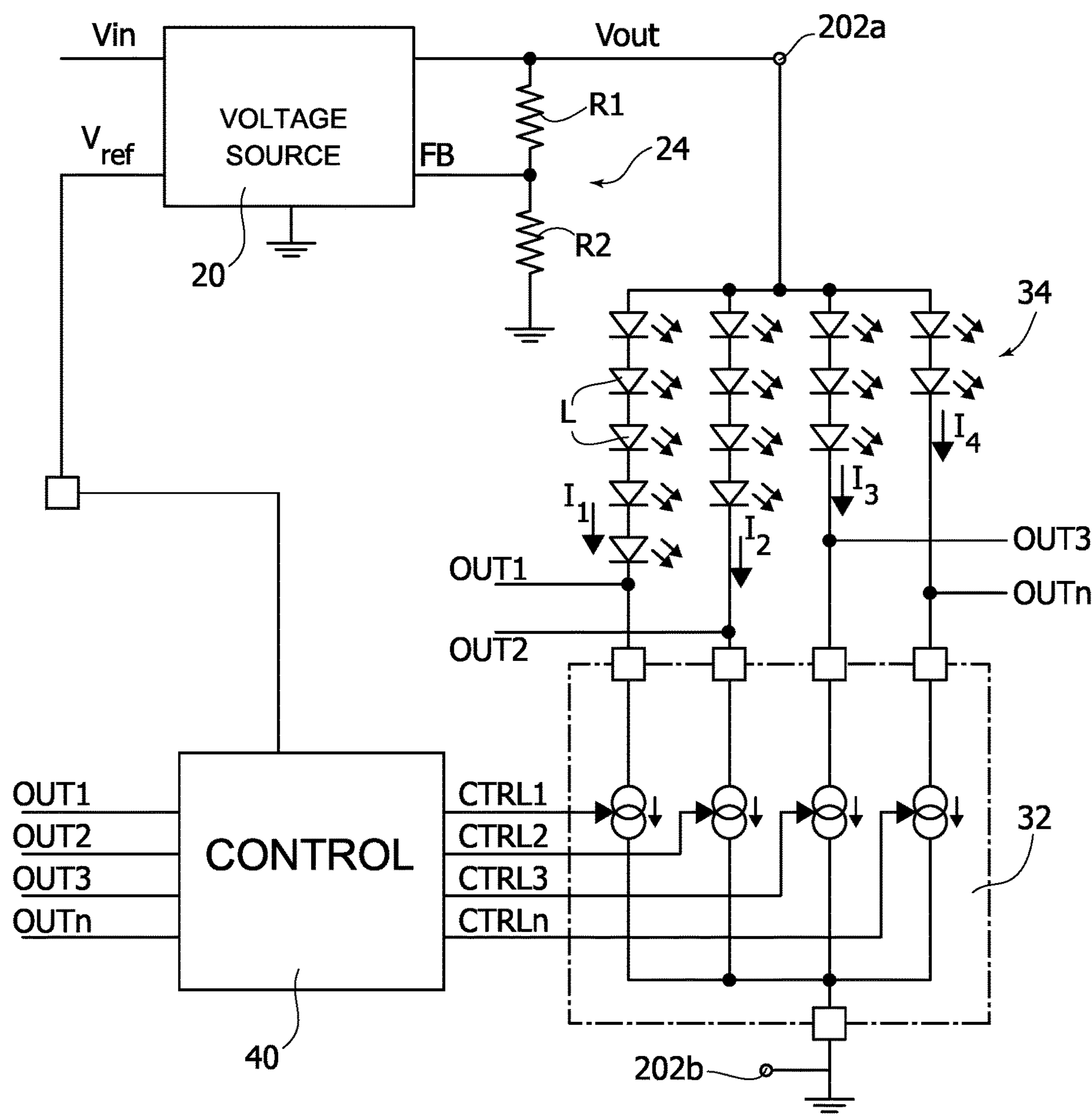
FIGS. 6 and 7 show embodiments of current supply systems for strings of solid-state light sources.
Figure 7:
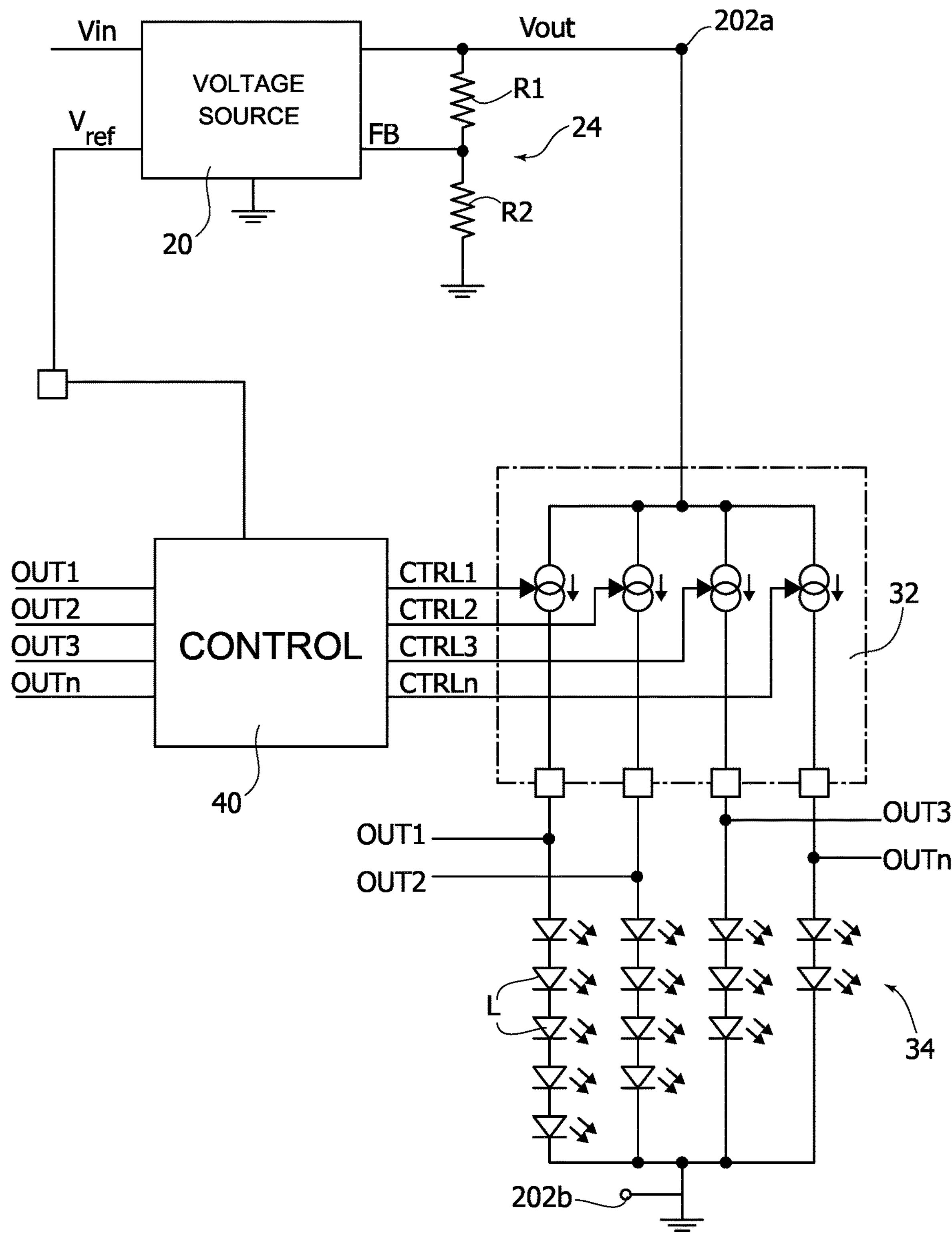

FIG. 6 shows a first embodiment in line with the description of FIG. 4B, and FIG. 7 shows a first embodiment in line with the description of FIG. 4B.

Specifically, FIGS. 6 and 7 show embodiments of power supply systems for a plurality of strings 34 of solid-state light sources L, such as LED or OLED strings.

Figure 2:
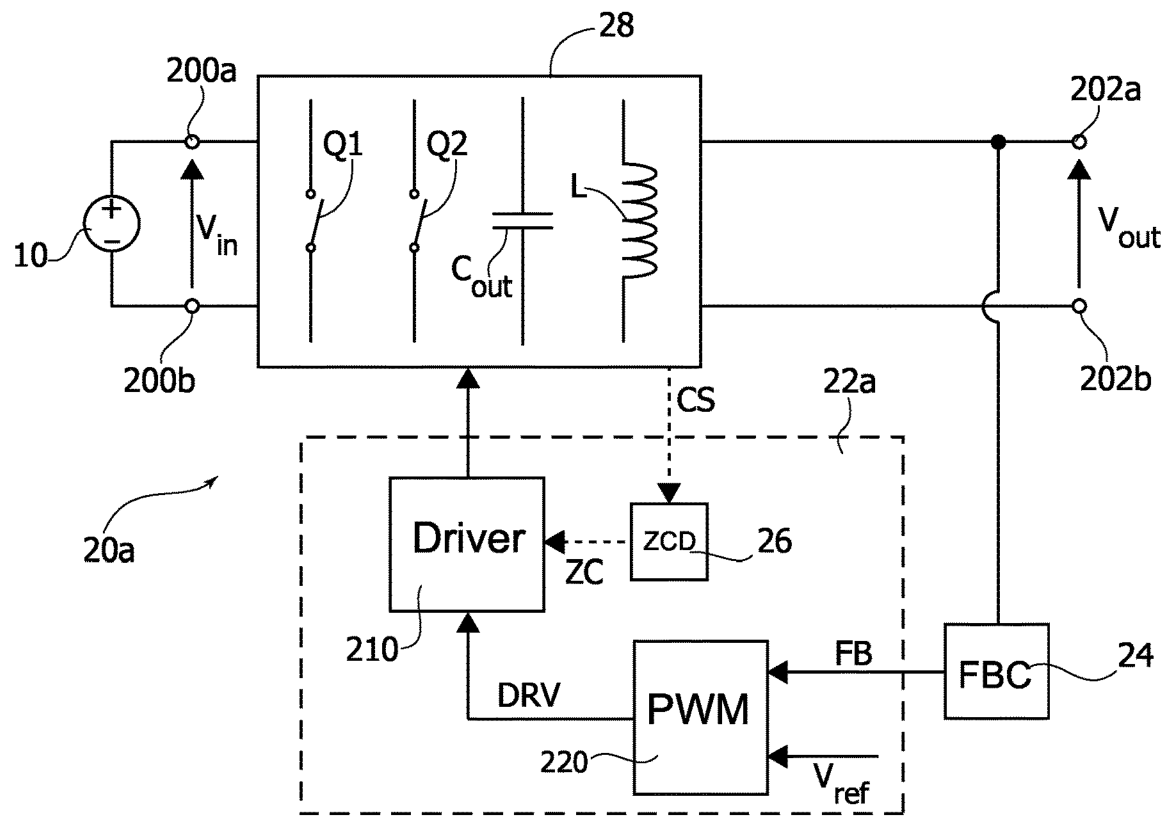
FIGS. 2 and 3 show and example of a voltage source implemented with an electronic converter.

Specifically, in the embodiments considered, the power supply system comprises a variable voltage source 20 comprising: two input terminals (e.g., the terminals 200*a* and 200*b* described with respect to FIGS. 1 and 2) configured to receive an input voltage yin, and a positive output terminal 202*a* and a negative output terminal 202*b* configured to provide a (regulated) output voltage $V_{out}$.

Figure 3:
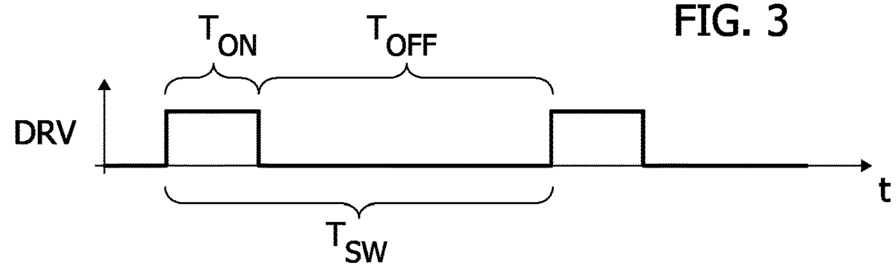

Generally, the voltage source 20 may be a linear regulator or preferably a switched mode electronic converter as described with respect to FIGS. 2 and 3. For example, in FIGS. 6 and 7 is shown schematically a voltage source 20 configured to receive: from a feedback circuit 24, such as a voltage divider comprising at least two resistors R1 and R2, a feedback signal FB indicative of (and preferably proportional to) the output voltage $V_{out}$; and a reference signal $V_{ref}$, indicative of (and preferably proportional to) a requested output voltage $V_{out}$.

In various embodiments, the feedback circuit 24 may also be integrated directly in the voltage source 20.

In the embodiments considered, the power supply system comprises moreover a current supply system. Specifically, the current supply system comprises:

- one or more first terminals configured to be connected to a first output terminal of the voltage source 20, e.g., the negative output terminal 202*b* in FIG. 6 or the positive output terminal 202*a* in FIG. 7; and
- a given number n of second terminals OUT1, . . . , OUTn (e.g., terminals OUT1, . . . , OUT4), wherein each second terminal OUT is configured to be connected via a respective string of solid-state light sources 34 to a second output terminal of the voltage source 20, e.g., the positive output terminal 202*a* in FIG. 6 or the negative output terminal 202*b* in FIG. 7; and
- a given number n of current regulators/limiters 32, wherein a respective current regulator/limiter 32 is connected (e.g., directly) between a respective second terminal OUT and at least one of said one or more first terminals.

Specifically, each current regulator/limiter 32 is configured to limit the current flowing through the current regulator/limiter 32 to a respective maximum value as a function of a respective control signal CTRL (i.e., signals CTRL1, . . . , CTRLn), whereby each current regulator/limiter 32 is configured to limit the current flowing through a respective string of solid-state light sources 34 to the respective maximum value. Specifically, the current regulators/limiters 32 are current sinks in the embodiment shown in FIG. 6, and current sources in the embodiment shown in FIG. 7.

In the embodiment considered, the current supply system comprises moreover a further terminal for providing the reference signal $V_{ref}$ to the voltage source 20 and a control circuit 40 configured to: generate the control signals CTRL1, . . . , CTRLn; monitor the voltages at each of the second terminals OUT1, . . . , OUTn; and generate the reference signal $V_{ref}$ at the further terminal, thereby setting requested output voltage $V_{out}$.

In various embodiments, the current supply system, in particular the current regulators/limiters 32 and the control circuit 40, may be implemented in the same integrated circuit. In various embodiments, also the control circuit 22 of the voltage source 20 (see FIG. 2) may be implemented in the same integrated circuit.

As mentioned before, in various embodiments, the control signals CTRL may be binary signals, wherein each current regulator/limiter 32 is configured to limit the current flowing through the respective string 34 to zero when the signal CTRL has a first logic value and to a respective (constant) maximum value when the signal CTRL has a second logic value. However, the signal CTRL may also be an analog signal able to set directly the maximum value or a digital signal able to set a plurality of maximum value.

For example, in various embodiments, the control circuit 40 is configured to generate the signals CTRL as Pulse-Width Modulated (PWM) signals, wherein the signals have the same switching period, but each signal CTRL has a respective duty-cycle.

In various embodiments, the strings 34 may also comprise a different number of light sources L (see the description of FIGS. 4A and 4B). Additionally or alternatively, each light source L may also have associated a respective electronic switch configured to selectively short-circuit the light source L, thereby permitting an individual control of the power supply of each light source (see the description of FIG. 5).

Accordingly, each signal CTRL may also comprise plural analog and/or digital signals, such as a signal for setting the maximum value, and one or more PWM signals for switching on and off the respective LED string 34 and/or subsets of the light sources L or the respective LED string 34.

For example, in various embodiments, the control circuit 40 may be configured to generate the signals CTRL and optionally the drive signals Sw_ctrl for the additional electronic switches Sw in order to generate a requested illumination pattern, e.g., of an active LED or OLED panel. For example, for this purpose, the control circuit 40 may comprise a communication interface for receiving data identifying the requested illumination pattern.

Thus, in various embodiments, the number of activated strings of solid-state light sources 34 may change over time. Moreover, in various embodiments, the number of solid-state light sources of the stings 34 may be different (based on the application), or the number of activated solid-state light sources of the activated stings 34 may change over time, i.e., the voltage drop at the activated strings 34 may change over time. Moreover, the voltage drop at the activated strings 34 may also change for other reasons, such as temperature variations and/or due to a different setting of the maximum current flowing through the string.

In various embodiments, the control circuit 40 is configured to generate the reference signal $V_{ref}$ as a function of the voltages $V_{OUT1}, \ldots, V_{OUTn}$ at the terminals OUT1, . . . , OUTn. Generally, the control circuit 40 may be configured to measure the voltage $V_{OUT1}, \ldots, V_{OUTn}$ at the terminals OUT1, . . . , OUTn either with respect to the positive terminal 202*a* (i.e., $V_{out}$) or preferably the negative terminal 202*b* (i.e., ground). For example, in FIG. 6, the control circuit 40 is configured to measure the voltage at the terminal OUT with respect to the one or more first terminals (connected to the negative terminal/ground 202*b*), thereby measuring the voltage drop at the respective current regulator/limiter 32. Conversely, in FIG. 7, the control circuit 40 is configured to measure the voltage at the terminal OUT with respect to the negative terminal/ground 202*b*, thereby measuring the voltage drop at the respective string of solid-state light sources 34.

Specifically, in various embodiments, the control circuit 40 is configured to determine the maximum voltage drop $V_{LED\_MAX}$ at the strings 34 and set the output voltage $V_{out}$ (via the reference signal $V_{ref}$) to a value being greater by a given amount $V_M$. In various embodiments, this dynamic adaptation is performed without interrupting the current illumination pattern projected by the strings 34. For example, this is particularly relevant in the automotive field, where the strings 34 may be used to signal warning or danger situations. In various embodiments, the dynamic adaption is also able to regulate the output voltage in order to adapt the output voltage to other variations, such as aging phenomena, which are particularly relevant for OLEDs, process spread and/or temperature.

In various embodiments, the above operations are performed via a digital processing within the control circuit 40. For example, this has the advantage, that the control circuit 40 may also perform a series of further diagnostic and functional operations, such as:

- monitoring the load conditions, e.g., in order to determine a temporary or permanent open-load or short-circuit condition, which e.g., may be used to disable the respective string of light sources;
- monitoring one or more temperatures of the current regulators/limiters 32 and/or the strings 34, which may be used to disable the respective current limiter 32 and string 34, or reducing the respective maximum current;
- implementing a thermal derating model, wherein the maximum current is adapted based on the measurement of an excessive temperature of the light sources.

As mentioned before, in general, the current supply system comprises a given number n of current regulators/limiters 32, which are connected to respective terminals OUT1, . . . , OUTn, wherein each terminal OUT1, . . . , OUTn may be connected via a respective string of solid-state light sources 34 to the output terminals of the voltage source 20. Generally, the number of strings 32 indeed connected to the n current regulators/limiters 32 may also be smaller than n. Moreover, each current regulator/limiter 32 may be always enabled, or preferably selectively enabled via the respective control signal CTRL1, . . . , CTRLn, i.e., the number of active strings 34 may be fixed or variable.

In various embodiments, the control circuit 40 is configured to: determine the activated strings of solid-state light sources 34, e.g., as a function of the control signal CTRL1, . . . , CTRLn; and determine a digital sample indicative of (and preferably proportional to) the maximum voltage drop at the activated strings of solid-state light sources 34.

As mentioned before, the control circuit 40 may be configured to directly monitor the voltage drop at the strings of solid-state light sources 34. In this respect the selection of the maximum voltage drop may be performed at an analog level (i.e., before the analog-to-digital conversion) or at a digital level (i.e., after the analog-to-digital conversion).

Alternatively, the control circuit 40 may be configured to monitor the voltage drop at the current regulators/limiters 32. In this case, the control circuit 40 may calculate the voltage drop at the strings of solid-state light sources 34 as a function of the voltage $V_{out}$ and the voltage drops at the current regulators/limiters 32. Also in this case, one or more of the previous operations may performed at an analog level (i.e., before the analog-to-digital conversion) or all operations may be performed at a digital level (i.e., after the analog-to-digital conversion).

Figure 8:
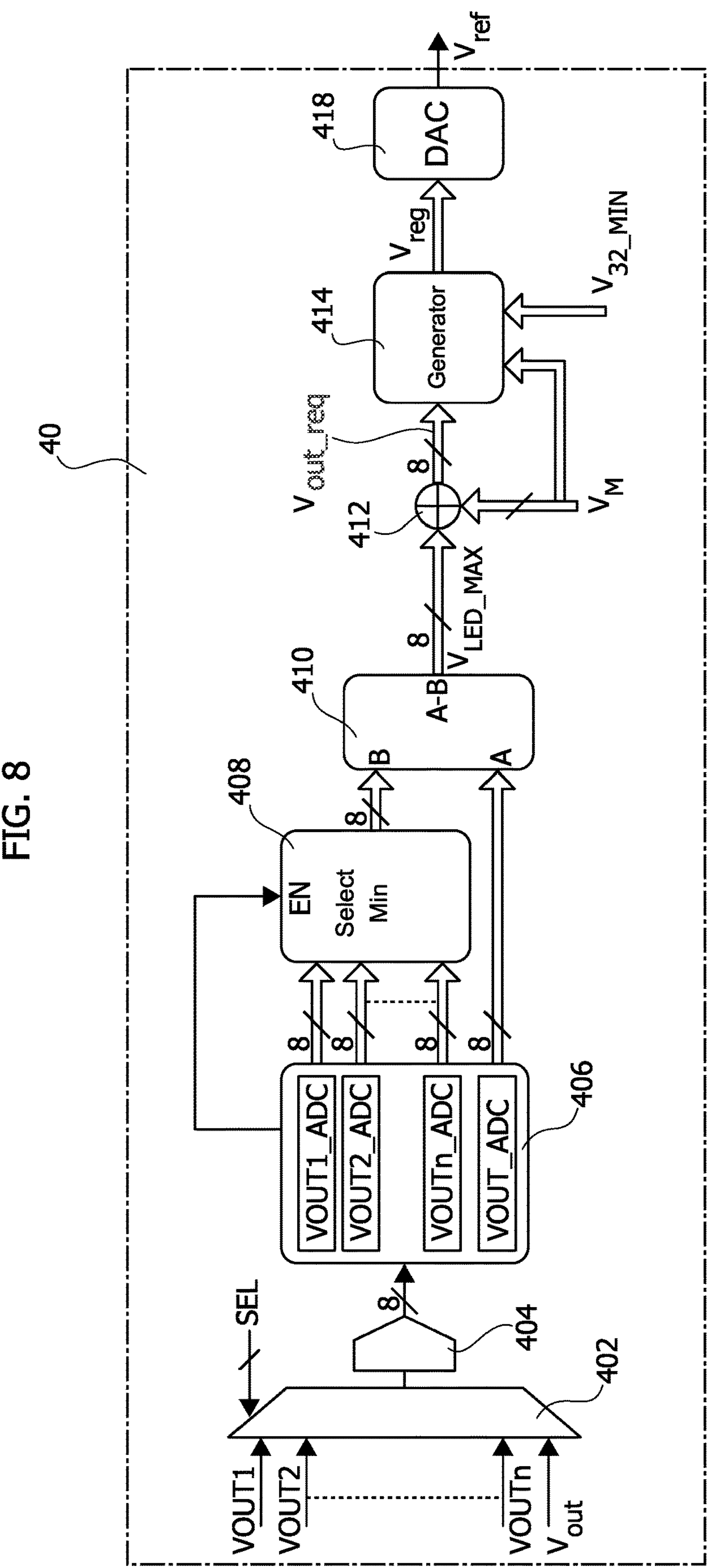
FIGS. 8 and 9 show embodiments of control circuits for the current supply systems of FIGS. 6 and 7.

For example, FIG. 8 shows an embodiment of the control circuit 40, wherein the control circuit 40 is configured to monitor voltages indicative of (and preferably proportional to) the voltage-drop at the current regulators/limiters 32, e.g., by measuring in FIG. 6 the voltages at the terminals OUT with respect to the terminal 202*b*/ground.

For example, in the embodiment considered, the control circuit 40 is configured to acquire digital samples $V_{OUT1\_ADC}, \ldots, V_{OUTn\_ADC}$ of the voltages $V_{OUT1}, \ldots, V_{OUTn}$ at the terminals OUT1, . . . , OUTn and store these digital samples $V_{OUT1\_ADC}, \ldots, V_{OUTn\_ADC}$ to a memory 406. For example, as schematically shown in FIG. 8, the control circuit may comprise for this purpose at least one analog-to-digital converter (ADC) 404, and an optional multiplexer 402 configured to connect the one or more analog-to-digital converter 404 to the terminals OUT1, . . . , OUTn. Generally, the multiplexer 402 is purely optional, because the control circuit 50 could also comprise n ADC 404, i.e. one for each terminal OUT1, . . . , OUTn. For example, in various embodiments, the ADC(s) 404 have a resolution of 8, 12 or 16 bits.

Generally, the number of ADC(s) and the respective conversion speed should be selected in order to ensure that the voltages $V_{OUT1}, \ldots, V_{OUTn}$ may be sampled with a sufficiently high frequency.

For example, as mentioned before, the signals CTRL may be PWM signals, wherein each signal CTRL1, . . . , CTRLn is set to high for a given switch-on duration (the respective string is activated) and low for a given switch-off duration (the respective string is deactivated). Generally, a signal CTRL1, . . . , CTRLn may also remain low during the complete PWM cycle, thereby deactivating the respective string, i.e., the duty cycle may be selected in a range of [0; 1].

Accordingly, the control circuit 40 may be configured to obtain a one or more digital samples of each voltage $V_{OUT1}, \ldots, V_{OUTn}$, while the respective signal CTRL1, . . . , CTRLn is set to high. For example, typically such PWM signals have a frequency between 200 and 1400 Hz. Accordingly, a single ADC 404 may be used if the minimum switch-on time of the PWM signals is greater than the ADC conversion time plus multiplex time for sampling all the channels.

In various embodiments, the control circuit 40 may also introduce a phase shift between the various signal CTRL1, . . . , CTRLn, which permits to sample the various voltages is sequence. In various embodiments, the control may also be configured to ensure, for the strings 34 to be activated during a given PWM cycle, that the switch-on time is greater than a given minimum value, which permits a sampling via the ADC(s) 404.

Accordingly, in the embodiment considered, the samples $V_{OUT1\_ADC}, \ldots, V_{OUTn\_ADC}$ are indicative of the voltage drops at the current regulators/limiters 32.

In the embodiment considered, the control circuit 40 is thus also configured to acquire (via the one or more ADC 404 and the optional multiplexer 402) a digital sample $V_{out\_ADC}$ of the voltage $V_{out}$ at the terminal 202*a*, and store the sample $V_{out\_ADC}$ to the memory 406.

Specifically, in various embodiments, the control circuit 40 is configured to determine the maximum voltage drop $V_{LED\_MAX}$ at the activated strings 32 (e.g., the strings 34 wherein the respective signal CTRL1, . . . , CTRLn has been set to high during the current PWM cycle) as a function of the digital samples $V_{OUT1\_ADC}, \ldots, V_{OUTn\_ADC}$ and the digital sample digital sample $V_{out\_ADC}$.

For example, in the embodiment considered, the control circuit 40 selects first at a block/circuit 408 the minimum value $V_{OUT\_MIN}$ of the digital samples $V_{OUT1\_ADC}, \ldots, V_{OUTn\_ADC}$, i.e., the minimum voltage drop at the current regulators/limiters 32, and then calculates at a block/circuit 410 the maximum voltage drop $V_{LED\_MAX}$ according to the following equation:

$$V_{LED\_MAX}=V_{out\_ADC}-V_{OUT\_MIN} \quad (1)$$

Figure 9:
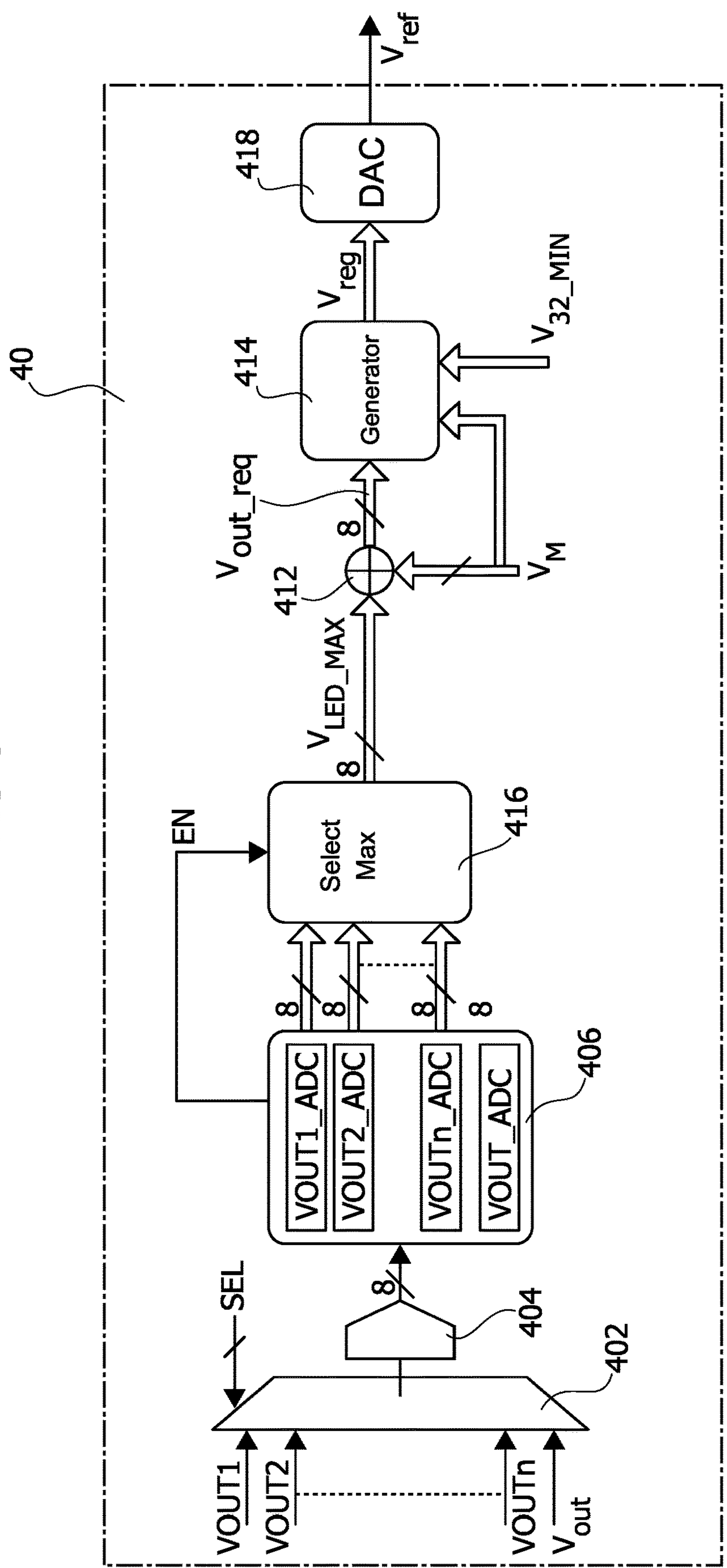

Conversely, FIG. 9 shows an embodiment, wherein the control circuit 40 is configured to monitor directly voltages indicative of (and preferably proportional to) the voltage-drop at the strings 24, e.g., by measuring in FIG. 7 the voltages at the terminals OUT1, . . . , OUTn with respect to the terminal 202*b*/ground.

Accordingly, in this case, the samples $V_{OUT1\_ADC}, \ldots, V_{OUTn\_ADC}$ stored to the memory 404 are already indicative of the voltage drops at strings 34, and the control circuit 40 is configured to determine the maximum voltage drop $V_{LED\_MAX}$ by selecting at a block/circuit 416 the maximum value of the digital samples $V_{OUT1\_ADC}, \ldots, V_{OUTn\_ADC}$.

Generally, as mentioned before, the selection at the block 408 or the block 416 should only use samples $V_{OUT1\_ADC}, \ldots, V_{OUTn\_ADC}$ associated with activated current regulators/limiters 34. This may be implemented already during the AD conversion (i.e., by sampling only the values of the activated current regulators/limiters) and/or by selecting a subset of samples at the blocks 408 or 416 as a function of the control signals CTRL.

Accordingly, in the embodiments shown in FIGS. 8 and 9, the control circuit 40 is configured to obtain digital samples of the voltages at the terminals OUT1, . . . , OUTn and determine the maximum voltage drop $V_{LED\_MAX}$ at the strings 34. As mentioned before, this may involve also measuring the output voltage $V_{out}$ as shown in FIG. 8.

Once having obtained the maximum voltage drop $V_{LED\_MAX}$ the control circuit may determine the requested output voltage $V_{out\_req}$ by adding a given headroom voltage $V_M$ to the maximum voltage drop $V_{LED\_MAX}$, i.e.:

$$V_{out\_req}=V_{LED\_MAX}+V_M \quad (2)$$

For example, for typical current regulators/limiters, a headroom of 0.5 V to 1.5 V, e.g., between 0.5 V and 1.0 V is sufficient.

For example, FIGS. 8 and 9 schematically show an adder block/circuit 412 configured to generate a digital signal $V_{out\_req}$ by add the digital value $V_M$ to the digital value $V_{LED\_MAX}$.

Moreover, the control circuit 40 is configured to determine the value of the reference signal $V_{ref}$ as a function of the requested output voltage $V_{out\_req}$. Specifically, as mentioned before, in various embodiments, the feedback signal FB is proportional to the output voltage, and the voltage source 20 is configured to regulate the feedback signal FB to the reference signal $V_{ref}$, i.e. the output voltage may be calculated as follows:

$$V_{out} = \frac{1}{K} V_{ref} \quad (3)$$

For example, by using a voltage divider as shown in FIGS. 6 and 7, the output voltage may be calculated as follows:

$$V_{out} = V_{ref} \cdot \left(1 + \frac{R_1}{R_2}\right) \quad (4)$$

Accordingly, by reformulating equations (2) and (3), the value of the reference signal $V_{ref}$ may be calculated as:

$$V_{ref} = K \cdot (V_{LED\_MAX} + V_M) \quad (5)$$

For example, in various embodiments, the proportionality value K may be fixed in the control circuit 40 and the feedback circuit 24 should be configured to use the same proportionality value K. Alternatively, the value K may be programmable.

For example, FIGS. 8 and 9 show a digital-to-analog converter (DAC) 418 configured to generate the reference signal $V_{ref}$ as a function of a digital signal $V_{reg}$ and a block/circuit 414 configured to generate the $V_{reg}$ as a function of the digital signal $V_{out\_req}$, e.g., by scaling the signal $V_{out\_req}$ according to the coefficient. Indeed, the circuit 414 may be configured to use a proportionality value, which also takes into account the conversion ratio of the DAC 418 in order to obtain the requested reference signal $V_{ref}$ as shown in equation (5).

Accordingly, in various embodiments, the output voltage $V_{out}$ is set to the maximum voltage $V_{LED\_MAX}$ drop at the stings 34, which are activated during a given PWM cycle, plus an additional headroom voltage $V_M$, thereby automatically optimizing the power supplied, in all operating conditions.

However, in case an additional string 34 is activated during the next PWM period, this string 34 may have a voltage drop being greater or smaller than the previous maximum voltage drop. For example, in case the voltage drop is greater, the output voltage $V_{out}$ may be too small to power the light sources of this string 34, whereby the respective light sources are not switched on, thereby resulting in an open-load condition.

In various embodiments, the control circuit 40 is configured to determine such an open-load condition, e.g., based on the value of the respective voltage $V_{OUT1\_ADC}, \ldots, V_{OUTn\_ADC}$ or by using additional current sensors, and then set the value $V_{ref}$ to a given maximum value $V_{ref\_MAX}$.

Additionally or alternatively, the control circuit 40 may be configured to: store the respective value $V_{OUT1\_ADC}, \ldots, V_{OUTn}$ ADC when the string 34 is activated; maintain stored the respective value $V_{OUT1\_ADC}, \ldots, V_{OUTn}$ ADC when the string 34 is deactivated strings 34; and once a new string 34 is activated during a following PWM cycle, use the stored values in order to determine whether the stored value is greater than the previous maximum value $V_{LED\_MAX}$; and in case the stored value is greater, set the value $V_{ref}$ to a given maximum value $V_{ref\_MAX}$.

Accordingly, in the event that a string 34 is enabled, which has a voltage drop exceeding the previously calculated maximum value $V_{LED\_MAX}$, the control circuit 40 may immediately sets the value of the output DAC 414 to a maximum value.

Accordingly, in the embodiments considered so far, an open-loop/feed-forward control of the reference signal $V_{ref}$ is used. In practice, the value of the coefficient K is fixed or set inside control circuit 40, e.g., in the block 414, while the feedback circuit should be configured to use the same coefficient K, e.g., via the ratio R1/R2. Accordingly, this type of control is particularly useful in case of large variations of the maximum voltage drop $V_{LED\_MAX}$ at the string 34.

However, small variations of the constant K and of the respective feedback ratio of the feedback circuit 24 (e.g., the ratio R1/R2) due to the spread of the components or temperature variations could bring the regulated voltage $V_{out}$ to a higher or lower value than expected, with a consequent increase or decrease of the minimum voltage $V_{32\_MIN}$ drop at the current regulators/limiters 32, which should correspond to the voltage $V_M$, thereby affecting the optimization of the system in terms of increased power dissipation in one case or by not allowing the correct supply of current in the other case.

Accordingly, in various embodiments, the previous feed-forward control is used to set the reference signal $V_{ref}$ when the system is switched on (e.g., by switching all string 34 temporarily on), and optionally when one or more strings 34 are not anymore activated during the following PWM cycle and/or when one or more additional strings 34 are reactivated during the following PWM cycle. Generally, as will be described in greater detail in the following, the feed-forward control may also be used in response to detecting other events.

Conversely, an additional closed loop control is used to regulate the reference signal $V_{ref}$ in order to regulate the minimum voltage drop $V_{32\_MIN}$ at the current regulators/limiters 32 to the value $V_M$ (see also equation (5)).

For example, as schematically shown in FIGS. 8 and 9, this additional closed loop regulation may be implemented in the block/circuit 414, which may also receive the minimum voltage drop $V_{32\_MIN}$ and the value $V_M$.

Generally, the control circuit 40, e.g., via the ADC(s) 406 and the block 408/416, may be configured to determine the minimum voltage drop $V_{32\_MIN}$ by directly measuring the voltage drops $V_{32}$ at the current regulators/limiters 32 (see FIG. 8) or by calculating the difference between the current output voltage $V_{out\_ADC}$ and the maximum voltage $V_{LED\_MAX}$ (measured in FIG. 9).

For example, in various embodiments, the control circuit 40, e.g., the block/circuit 414, may be configured to implement a (digital) regulator comprising an Integral component, wherein the control circuit 40 is configured to vary (increase or decrease) the digital signal $V_{reg}$ provided to the DAC 418 until the minimum voltage drop $V_{32\_MIN}$ corresponds to the voltage $V_M$.

Conversely, in various embodiments, the control circuit 40 is configured to use an approximated regulation, wherein the value of the digital signal $V_{reg}$ is varied based on a table have stored for a plurality of ranges of the minimum voltage drop $V_{32\_MIN}$ a respective variation of the value $V_{reg}$. For example, in various embodiments, the block/circuit 414 uses the following variations of the signal $V_{reg}$, where the value OL_THR represents a lower threshold, e.g., a threshold being indicate of an open-load condition, such as 0.5V:

| $V_{32\_MIN}$ | $V_{reg}$ |
| --- | --- |
| <OL_THR | +16 |
| [OL_THR; 0.71V] | +4 |
| [0.71V; 1.03V] | +1 |
| [1.03V; 1.19V] | 0 |
| [1.19V; 1.51V] | −1 |
| [1.51V; 1.91V] | −4 |
| >1.91V | −8 |

Accordingly, in this case, the voltage $V_{32\_MIN}$ is regulated to a value in the range of [1.03V; 1.19V]. Instead of storing the values for the minimum voltage drop $V_{32\_MIN}$, the table may also store the ranges for the difference between the minimum voltage drop $V_{32\_MIN}$ and the voltage $V_M$.

Another exemplary regulation may use the following variations of the signal $V_{reg}$:

| $V_{32\_MIN}$ | $V_{reg}$ |
| --- | --- |
| <OL_THR | +12 |
| [OL_THR; 0.63V] | +4 |
| [0.63V; 1.25V] | +1 |
| [1.25V; 1.57V] | 0 |
| [1.57V; 1.88V] | −1 |
| [1.88V; 2.20V] | −4 |
| >2.20V | −4 |

Accordingly, in this case, the voltage $V_{32\_MIN}$ is regulated to a value in the range of [1.25V; 1.57V].

Accordingly, even if the ratio between the reference voltage $V_{ref}$ and the output voltage $V_{out}$ is not exactly equal to 1/K, the control circuit 40 is able to correct, in very few steps, the minimum voltage drop $V_{32\_MIN}$, in particular until $V_{32\_MIN}=V_M$.

For example, once having set the reference signal $V_{reg}$ in a given PWM cycle, the control block may use during the following PWM cycles the closed loop control in order to further adjust the minimum voltage drop $V_{32\_MIN}$. Generally, based on the velocity of the regulation of the voltage source 20, the control circuit 40 may vary the reference signal $V_{reg}$ at each PWM cycle, or after a given number PWM cycles.

Figure 10:
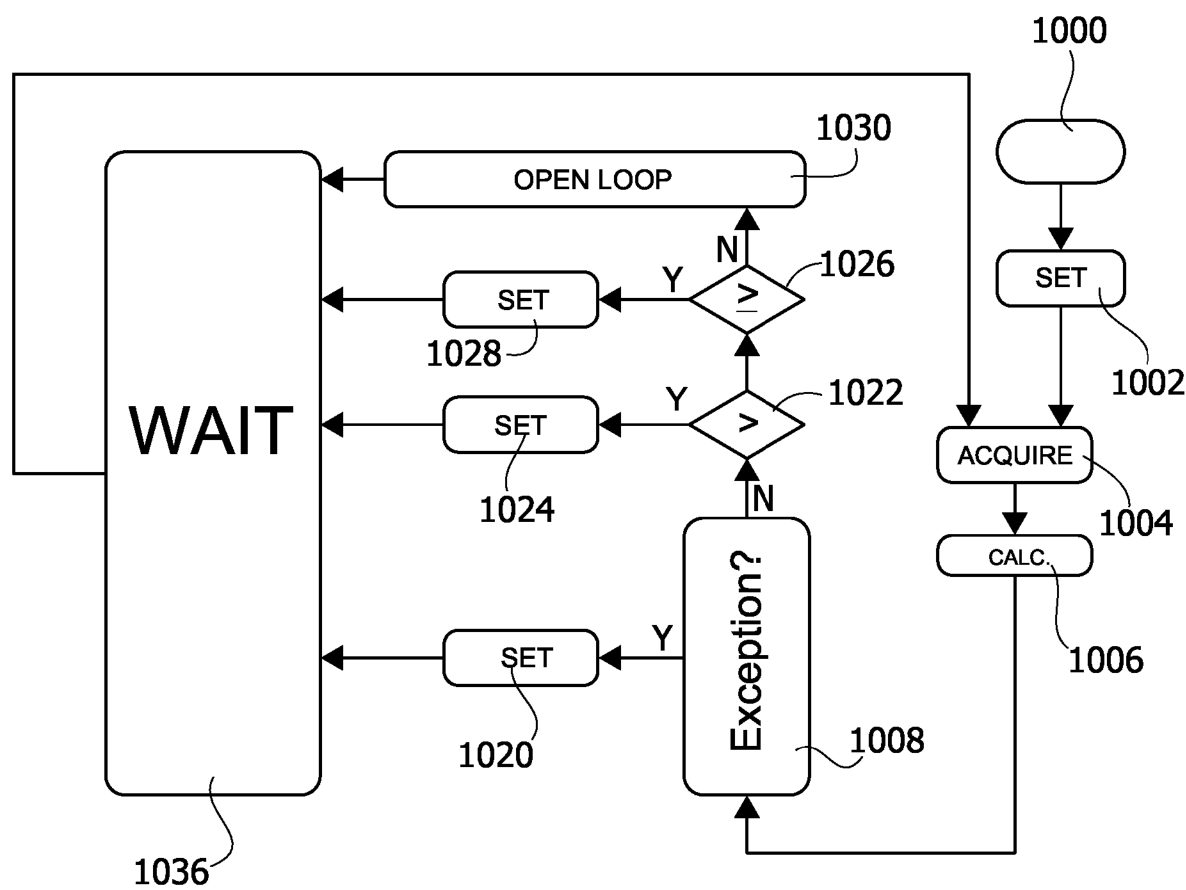
FIGS. 10 and 11 show embodiments of the operation of the control circuits of FIGS. 8 and 9.

FIG. 10 shows a flowchart of an embodiment of the operation of control circuit 40.

Specifically, after a start step 1000, the control circuit 40 sets at a step 1002 the value $V_{reg}$ to a given maximum value MAX, such as 255, whereby the voltage source 20 provides a maximum output voltage $V_{max}$. Next the control circuit 40 proceeds to a step 1004, where the control circuit 40 acquired via the ADC(s) 404 the samples of the voltages $V_{OUT1\_ADC}, \ldots, V_{OUTn\_ADC}$ at the terminals OUT1, . . . , OUTn. At a step 1006, the control circuit 40 calculates then the requested digital signal $V_{out\_req}$, e.g., as described in the foregoing (via the blocks 406, 408 and 410 in FIG. 8, or blocks 406 and 416 in FIG. 9).

In various embodiments, the control circuit 40 then proceeds to an optional exception handling routine 1008, which may analyze at least one of: the digital sample $V_{OUT1\_ADC}, \ldots, V_{OUTn}$ ADC, the maximum voltage drop $V_{LED\_MAX}$ at the stings 34 and/or the minimum voltage drop $V_{32\_MIN}$ at the regulators 34; and the control signals CTRL1, . . . , CTRLn.

In case an exception is detected (output "Y" of the step 1008), the control circuit proceeds to a step 1020, where value $V_{reg}$ is set to a given value, which may depend on the detected exception. Conversely, in case no exception is detected (output "N" of the step 1008), the control circuit proceeds to an optional step 1022, where the control circuit 40 may determine whether the value $V_{reg}$ is greater than a given minimum value MIN.

In case the value $V_{reg}$ corresponds to (or is smaller than) the minimum value MIN (output "Y" of the step 1022), the control circuit 40 sets at a step 1024 the value $V_{reg}$ to the maximum value MAX. Conversely, the value $V_{reg}$ is greater than the minimum value MIN (output "N" of the step 1008), the control circuit proceeds to a step 1022. As will be described in greater detail in the following, the value $V_{reg}$ may be set to the minimum value MIN, when all LED strings 32 are deactivated. Accordingly, the steps 1022 and 1024 are used to reactivate the voltage source 20, when at least one LED string 32 should be reactivated.

In the embodiment considered, the control circuit 40 determines at the step 1026 whether the value $V_{reg}$ corresponds to the maximum value MAX. In case the value $V_{reg}$ corresponds to (or is greater than) the maximum value MAX (output "Y" of the step 1022), the control circuit 40 sets at a step 1028 the value $V_{reg}$ to the requested digital signal $V_{out\_req}$, thereby implementing the feed-forward control. Accordingly, the feed-forward control at the step 1028 is started after the start-up (because the value is set to MAX at the step 1002) or may be started selectively by setting the value $V_{reg}$ to MAX at the 1020 in response to an exception detected at the step 1008.

Conversely, the value $V_{reg}$ does not correspond to (or is smaller than) the maximum value MAX (output "N" of the step 1026), the control circuit proceeds to a step 1030, where the open-loop control is used to vary the value $V_{reg}$ as a function of the minimum voltage drop $V_{32\_MIN}$.

Accordingly, once having set the value $V_{reg}$ at one of the steps 1020, 1024, 1028 or 1030, the control circuit 40 may proceed to a wait step 1036, which is used to set the update interval of the value $V_{reg}$, and the control circuit may return to the step 1004 for starting a new cycle.

Accordingly, in the embodiment considered, the steps 1008-1036 may be implemented within the circuit or module 414.

As mentioned before, the control circuit may handle various exceptions.

Figure 11:
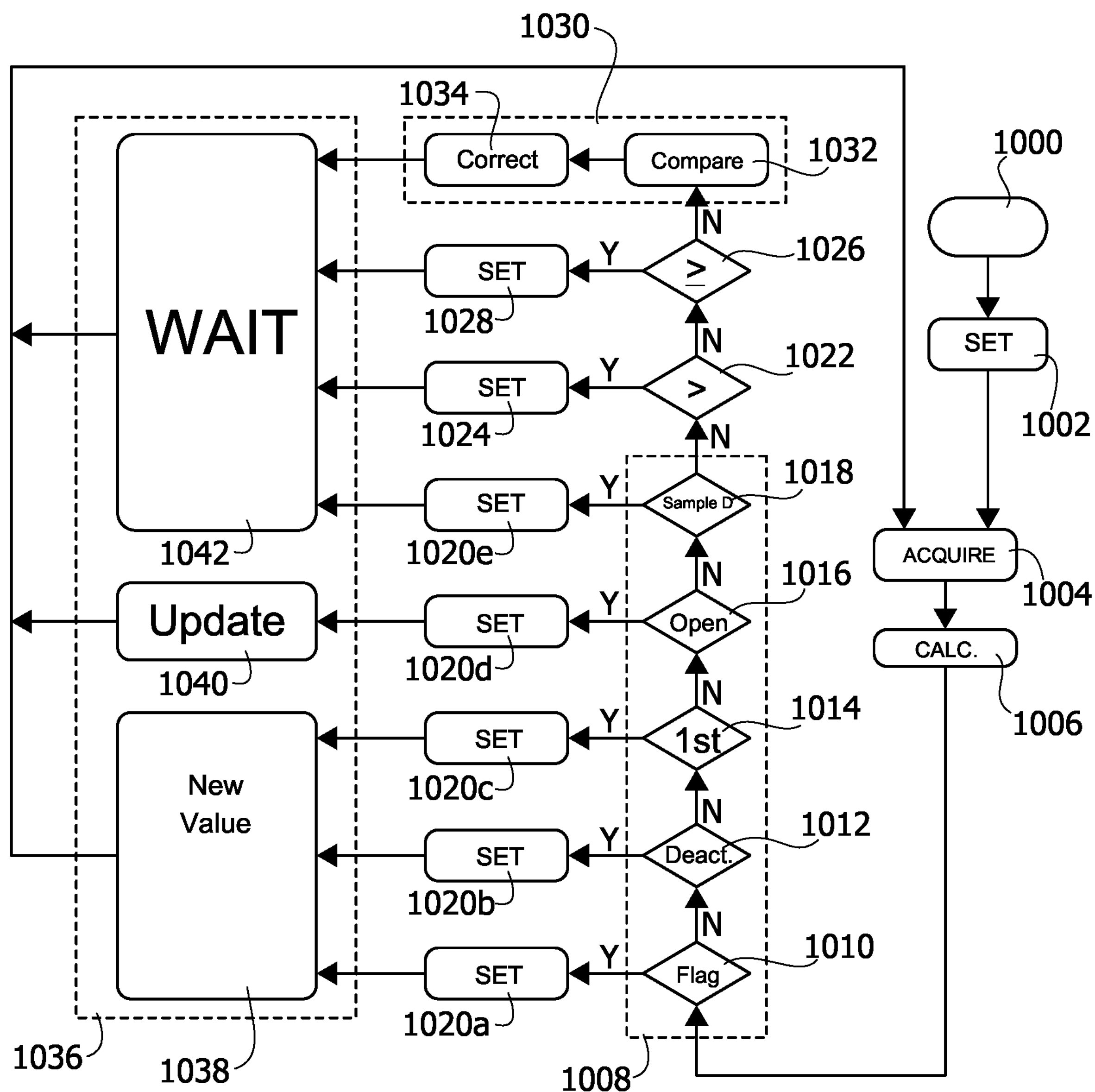

FIG. 11 shows in this respect an embodiment of the exception handling routine 1008.

Specifically, in the embodiment considered, the exception handling routine may be configured to verify one or more of the following conditions:

- at a step 1010, e.g., as a function of a programmable flag, whether the automatic adaption of the output voltage $V_{out}$ is enabled or disable;
- at a step 1012, e.g., as a function of the control signals CTRL1, . . . , CTRLn, whether all LED strings 34 are deactivated (e.g., during the current PWM cycle);
- at a step 1014, e.g., as a function of the control signals CTRL1, . . . , CTRLn, whether a given LED string is activated for the first time after a power-on of the system;
- at a step 1016, e.g., as a function of the values $V_{OUT1\_ADC}, \ldots, V_{OUTn\_ADC}$ and the control signals CTRL1, . . . , CTRLn, whether a temporary open load condition exists, e.g., by verifying whether one of voltages $V_{OUT1\_ADC}, \ldots, V_{OUTn\_ADC}$ indicates that the light sources L of the respective string 32 are switched of even though the respective control signal CTRL1, CTRLn indicates that the LED string is activated;
- at a step 1018, e.g., as a function of the control signals CTRL1, . . . , CTRLn, whether at least one of the control signals CTRL1, . . . , CTRLn has a switch-on duration which does not permit a sampling via the ADC(s) 404;

In various embodiments, as shown in FIG. 11, these steps may be arranged in sequence, e.g., from step 1010 to 1018, thereby permitting that the various exceptions are handled with a priority (e.g., the highest priority for the step 1010 to the lowest priority for the step 1018).

Accordingly, as mentioned before, the value $V_{reg}$ may be set based on the detected exception.

For example, in various embodiments, the control circuit 40 may be configured to implement one or more of the following operations:

- in response to detecting at the step 1010 that the automatic adaption of the output voltage $V_{out}$ is disable, setting at a step 1020*a* the value $V_{reg}$ to the maximum value MAX;
- in response to detecting at the step 1012 that all LED strings 34 are deactivated, setting at a step 1020*b* the value $V_{reg}$ to the minimum value MIN;
- in response to detecting at the step 1014 that a given LED string is activated for the first time after a power-on of the system, setting at a step 1020*c* the value $V_{reg}$ to the maximum value MAX;
- in response to detecting at the step 1016 a temporary open load condition, increasing at a step 1020*d* the value $V_{reg}$, e.g., by setting the value $V_{reg}$ to the maximum value MAX or by adding a constant value (such as 12 or 16 as shown in the previous tables) to the current value $V_{reg}$;
- in response to detecting at the step 1018 that a switch-on duration is too short to permit a sampling via the ADC(s) 404, setting at a step 1020*e* the value $V_{reg}$ to the maximum value MAX.

FIG. 11 also shows, that the open loop control at the step 1030 may involve a first step 1032, where the value $V_{32\_MIN}$ is compared to various ranges (see the previous tables), and a second step 1034 where a correction factor is added to the current value $V_{reg}$ as a function of the detected range of the value $V_{32\_MIN}$.

Accordingly, once the value $V_{reg}$ has been updated at one of the steps 1020*a*-1020*e*, 1024, 1028 or 1034, the control circuit 40 may proceed to the wait step 1036.

Generally, the same wait time may be used for all updates, or as shown in Figure, different wait steps may be used for different updates of the value $V_{reg}$.

For example, in the embodiment considered, the steps 1020*a*, 1020*b* and 1020*c* proceed to a step 1038, where the control circuit provides immediately the new value $V_{reg}$ to the DAC 418.

Conversely, the step 1020*d* may proceed to a step 1040, where the control circuit updates the $V_{reg}$ provided to the DAC 418 for the next PWM cycle, or preferably slightly before, such as 100 us before the start of the next PWM cycle.

Finally, in the embodiment considered, the steps 1024, 1028 and 1034 proceed to a step 1042, where the control circuit 40 waits for a given number of PWM cycles, e.g., the control circuit 40 may provide the new value $V_{reg}$ to the DAC 418 at the next PWM cycle after a given wait time, e.g., selected between 10 and 50 ms. For example, the wait time may be chosen based on the response time of the regulator 20 used to regulate the voltage $V_{out}$ to a new value.

Generally, due to the fact that the step 1012 is used to substantially deactivate the output voltage $V_{out}$ by setting the value $V_{reg}$ to the minimum value MIN, this step may also be used to detect other conditions, which may require that the output voltage $V_{out}$ is deactivated. For example, in various embodiments, the control circuit 40 is configured to proceed from the step 1012 to the step 1020*b* in response to detection one or more of the following conditions: an over-temperature condition of the voltage source 20, the current regulators 32 and/or the light sources L; and a malfunction of the ADC 404 and/or the DAC 414.

Accordingly, in various embodiments, the control circuit 40 may be configured to:

- manage the start-up of the device;
- manage stand-by and fail-safe situations, e.g., by switching off the current supply to the string 34, when the control circuit does not receive data indicative of a requested illumination pattern;
- manage temporary or permanent open-load conditions;
- manage the current derating procedure on the LEDs in case of dangerous heating and/or a thermal shutdown, e.g., in case of excessive power dissipated by the current regulators/limiters 32 and/or in case of excessive heating of the current regulators/limiters 32;
- in case of battery system, manage a low-power mode, e.g., by reducing the current flowing through the strings and/or switching the string 34 off;
- manage possible short-circuit conditions, e.g., by switching off the respective string 34;
- manage given conditions of the control signals CTRL, e.g., in order to ensure that the duty-cycle is long enough in order to permit a sampling of the respective voltage $V_{OUT}$ during the respective switch-on period.

Accordingly, in the previous embodiments, each current supply system may be used to supply up to N strings of light sources. In typical applications, the number of strings to be supplied may, however, also be greater than 50, e.g., more than 100 strings.

Accordingly, in this case, the current supply system, e.g., the respective integrated circuit, would need a significant number of current regulators/limiters 32, which would be rather useless in case only a small number of strings 34 would need to be supplied. Alternatively, the stings 34 may be split in subgroups, wherein each subgroup of strings 34 is supplied via a respective voltage source 20 and a respective current supply system. However, this also involves additional cost because additional voltage sources have to be used.

Figure 12:
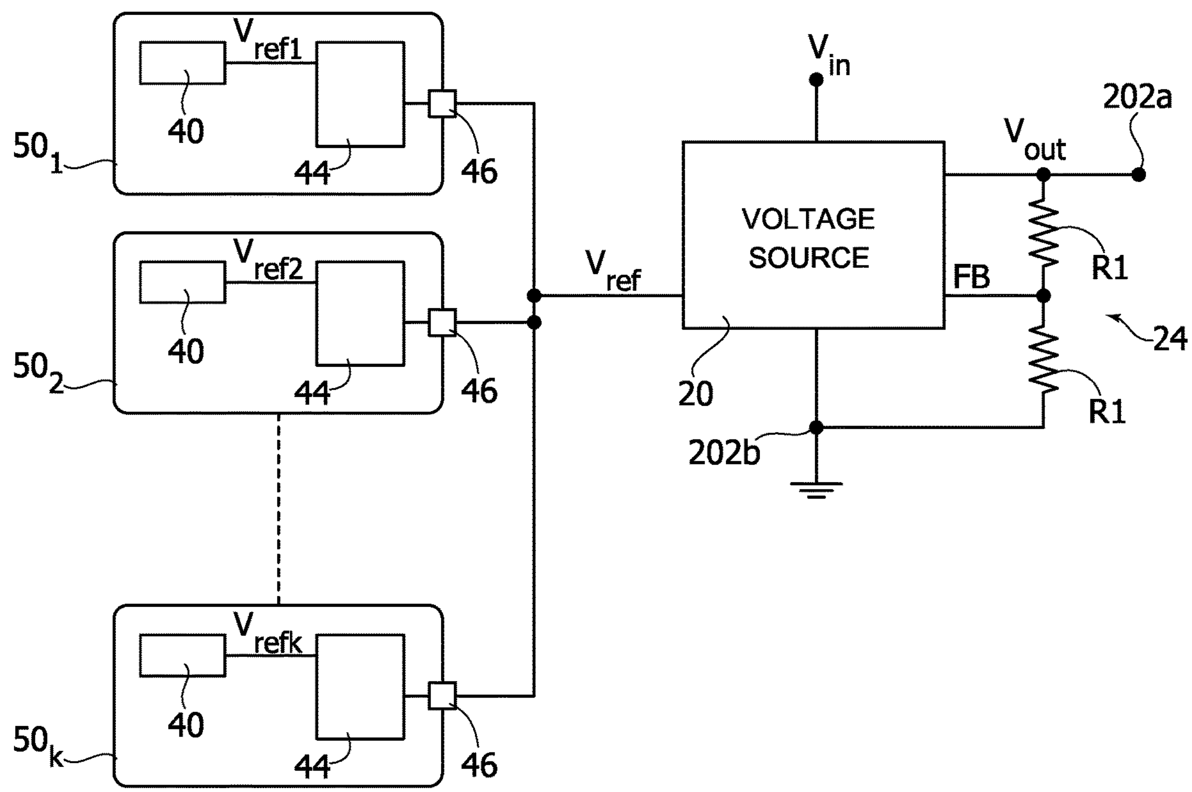
FIGS. 12 and 13 show embodiments wherein a plurality of current supply systems are connected to the same voltage source.

Conversely, FIG. 12 shows a modular system, wherein a single voltage source 20 and a plurality of current supply systems, indicated in FIG. 12 with the reference signs $\mathbf{50}_1, \ldots, \mathbf{50}_k$, is used to supply the strings 34. For example, as mentioned before, such current supply systems may be implemented in respective integrated circuits.

Specifically, as described in the foregoing, each current supply system $\mathbf{50}_1, \ldots, \mathbf{50}_k$ comprises N current regulators/limiters 32 connected to respective terminals OUT1, . . . , OUTN and a control circuit 40 configured to set the reference signal $V_{ref}$ as a function of the voltages at the terminals OUT1, . . . , OUTN. Specifically, the control circuit 40 is configured to set the reference signal $V_{ref}$ as a function of the maximum voltage drop at the strings 34 and/or the minimum voltage drop at the current regulators/limiters 32.

In this respect, the inventors have observed that the same voltage source 20 may be shared by a plurality of current supply systems $\mathbf{50}_1, \ldots, \mathbf{50}_k$ by using an additional circuit configured to provide to the voltage source 20 the greatest reference signal $V_{ref}$ provided by the various control circuits 44.

Specifically, as shown in FIG. 12, in this case, the power supply system comprises a voltage source 20 and a given number k of current supply systems $50_1, \ldots, 50_k$ connected to the same voltage source 20. For example, each current supply system $50_1, \ldots, 50_k$ may be configured to supply N strings, whereby a total of k*N strings may be supplied.

Specifically, each current supply system $50_1, \ldots, 50_k$ comprises a respective control circuit 40, which thus generates a respective reference signal $V_{ref1}, \ldots, V_{refk}$. Accordingly, in various embodiments, the power supply system comprises a circuit 44 configured to determine the greatest value of the reference signals $V_{ref1}, \ldots, V_{refk}$ and provide this greatest value to the voltage source 20 as reference signal $V_{ref}$.

Specifically, FIG. 12 shows an embodiment, wherein this circuit 44 is implemented in a distributed manner, by providing sub-circuit 44 within each current supply systems $50_1, \ldots, 50_k$. Specifically, each current supply system $50_1, \ldots, 50_k$ comprises a respective terminal 46 configured to be connected to the terminal $V_{ref}$ of the voltage source 20, i.e. in use these terminals 46 are connected together. Moreover, each sub-circuit 44 is configured to apply the respective reference signal $V_{ref1}, \ldots, V_{refk}$ the respective terminal 46, when the respective reference signal $V_{ref1}, \ldots, V_{refk}$ is greater than the voltage at the respective terminal 46.

Figure 13:
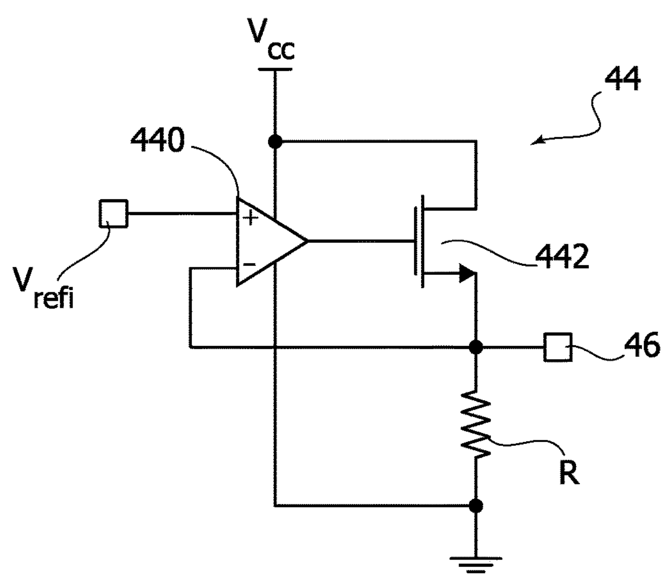

For example, FIG. 13 shows a possible embodiment of the circuit 44.

Specifically, in the embodiment considered, the circuit 44 comprises:

- a variable current source 442, such as a field effect transistor, configured to generate a positive current as a function of a control signal, wherein the current is provided to a resistor R, and wherein the voltage at the resistor R is applied to the terminal 46; and
- an operational amplifier 440 configured to receive at a first (positive/non-inverting) input the respective reference signal, indicated as $V_{refk}$, and at a second (negative/inverting) input the voltage at the resistor R, wherein the output of the operational amplifier 440 controls the variable current source 442.

Accordingly, in the embodiment considered, in case the voltage at the terminal 46 is smaller than the reference signal $V_{refk}$, the operational amplifier 440 varies the current supplied by the current source 442 until the voltage at the terminal 46 corresponds to the reference signal $V_{refk}$. However, in case the voltage at the terminal 46 is greater than the reference signal $V_{refk}$, the current source 442 will be deactivated and the voltage at the terminal 46 will be maintained.

Accordingly, in the case of very large LED or OLED systems, a single voltage source 20 may be shared by different current supply systems 50 by allowing only the control circuit 40 having the highest reference value $V_{ref}$ to control the voltage source 20.

The inventors have observed that often the reference voltage $V_{ref}$ of the voltage sources 20 is not externally available.

Figure 14:
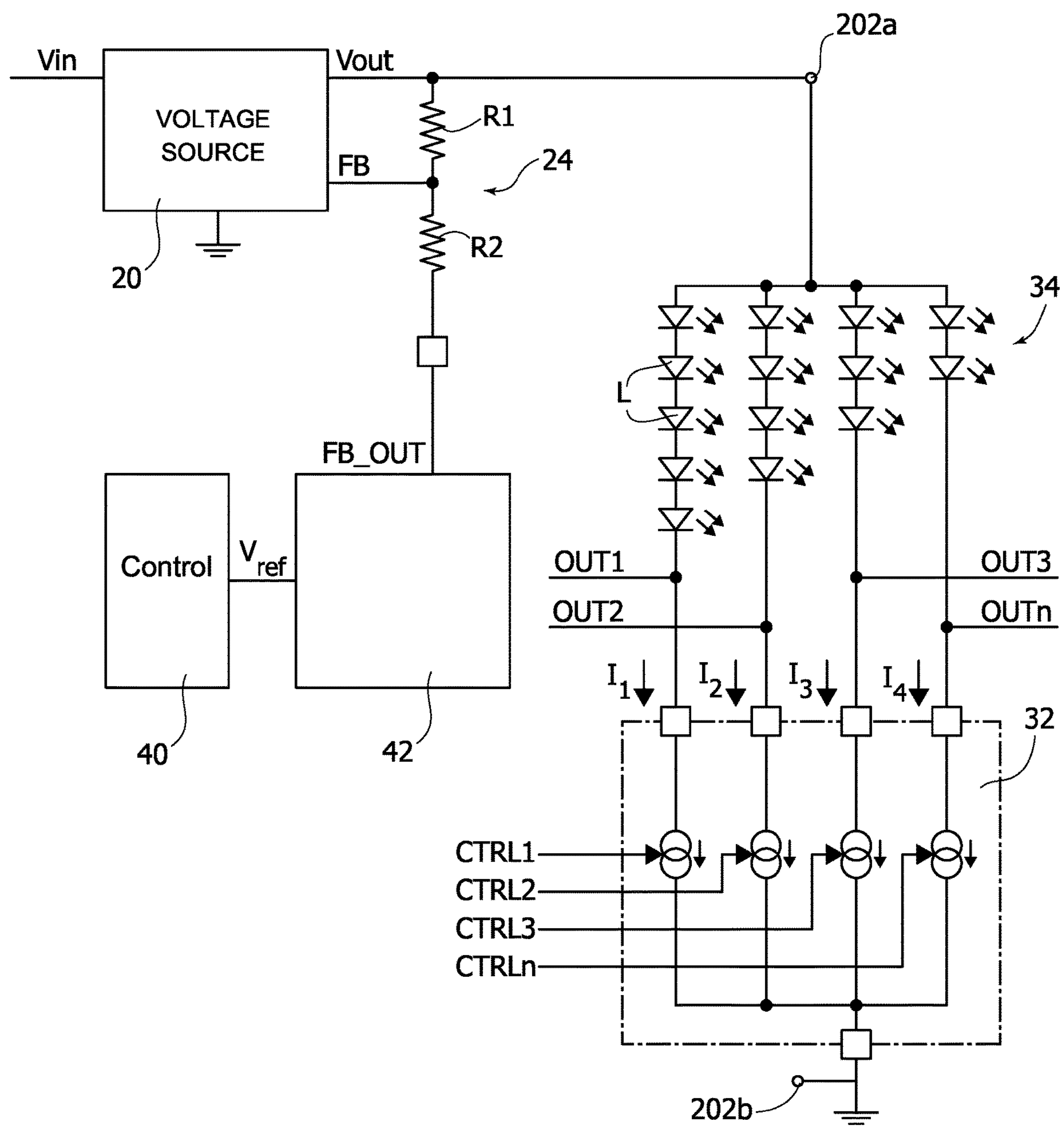
FIG. 14 shows a further embodiment of a current supply system for strings of solid-state light sources.

However, as shown in FIG. 14, in this case, the control circuit 40 may comprise or have associated a feedback adaption circuit 42 configured to adapt the feedback signal FB as a function of the reference signal $V_{ref}$ provided by the control circuit 40. For example, the feedback adaption circuit 42 may be configured to:

- as shown in FIG. 11, adapt the reference voltage of the feedback circuit 24, e.g., the resistors R1 and R2 may be connected in series between the voltage $V_{out}$ and a voltage FB_OUT provided by the feedback adaption circuit 42 as a function of the reference signal $V_{ref}$;
- injecting a current in the resistor R2, thereby altering the voltage drop at the resistor R2;
- varying the resistance of the resistor R1 and/or R2.

The claims are an integral part of the technical teaching of the disclosure provided herein.

Of course, without prejudice to the principle of the invention, the details of construction and the embodiments may vary widely with respect to what has been described and illustrated herein purely by way of example, without thereby departing from the scope of the present invention, as defined by the ensuing claims.

The invention claimed is:

1. A current supply system, comprising:

one or more first terminals configured to be connected to a first output terminal of a voltage source;

a plurality of second terminals, wherein each of said second terminals is configured to be connected via a respective string of solid-state light sources to a second output terminal of said voltage source;

a third terminal configured to provide a reference signal to said voltage source, said reference signal indicative of a requested output voltage to be generated by said voltage source between said first and said second output terminals of said voltage source;

a plurality of current regulators or limiters, wherein each of said second terminals is connected via a respective current regulator or limiter to at least one of said one or more first terminals, wherein each of said current regulators or limiters is configured to limit a current flowing through the string of solid-state light sources connected to the respective second terminal to a respective maximum value; and a control circuit configured to generate said reference signal and comprising:

at least one analog-to-digital converter configured to obtain digital samples of the voltages at said second terminal and the voltage between said first and said second output terminals of said voltage source;

a digital-to-analog conversion circuit configured to receive a digital regulation value and provide said reference signal;

a feed-forward control circuit configured to compute a feed-forward regulation value indicative of the requested output voltage by determining a maximum voltage drop between said second terminals and said second output terminal of said voltage source as a function of said digital samples and adding a given head-room to said maximum voltage drop; and a feed-back control circuit configured to determine a minimum voltage drop at said plurality of current regulators or limiters as a function of said digital samples and determine a feed-back correction value as a function of the difference between said minimum voltage drop and said head-room;

wherein said control circuit is configured, in response to a start-up of said current supply system, to set said digital regulation value to a first value indicative of a maximum requested output voltage, and then repeat the following operations:

determine whether said digital regulation value corresponds to said first value;

set said digital regulation value to said feed-forward regulation value if said digital regulation value is greater than or equal to said first value; and add said feed-back correction value to said digital regulation value if said digital regulation value is less than said first value.

2. The current supply system according to claim 1, wherein each of said current regulators or limiters is configured to receive from said control circuit at least one control signal indicating at least a first operating mode and a second operating mode;

wherein the respective current regulator or limiter is configured to deactivate said current if said at least one control signal indicates said first operating mode; and wherein the respective current regulator or limiter is configured to limit said current to said respective maximum value if said at least one control signal indicates said second operating mode.

3. The current supply system according to claim 2, wherein said at least one control signal comprises a Pulse-Width Modulated signal, wherein a first logic level of said Pulse-Width Modulated signal indicates said first operating mode and wherein a second logic level of said Pulse-Width Modulated signal indicates said second operating mode.

4. The current supply system according to claim 2, wherein said at least one control signal indicates said maximum value.

5. The current supply system according to claim 2, wherein said control circuit is configured to:

determine whether said at least one control signal indicates that said current regulators or limiters should use said first operating mode; and set said digital regulation value to a second value indicative of a minimum requested output voltage if said at least one control signal indicates that said current regulators or limiters should use said first operating mode.

6. The current supply system according to claim 5, wherein said control circuit is configured to:

determine whether said digital regulation value corresponds to said second value if said at least one control signal indicates that at least one of said currents regulators or limiters should use said second operating mode; and set said digital regulation value to said first value if said digital regulation value corresponds to said second value.

7. The current supply system according to claim 2, wherein said control circuit is configured to:

determine whether said at least one control signal indicates that at least one current regulator or limiter should use said second operating mode;

determine whether a current is flowing through said at least one current regulator or limiter which should use said second operating mode if said at least one control signal indicates that at least one current regulator or limiter should use said second operating mode; and vary said digital regulation value in order to increase said requested output voltage if no current is flowing through at least one of said current regulators or limiters which should use said second operating mode.

8. The current supply system according to claim 1, wherein said reference signal is proportional to said requested output voltage to be generated by said voltage source, and wherein said digital-to-analog converter conversion circuit comprises an analog-to-digital converter configured to generate said reference signal as a function of said digital regulation value.

9. The current supply system according to claim 1, wherein said third terminal is configured to be coupled to a feedback terminal of said voltage source in order to vary a feedback signal indicative of the output voltage generated by said voltage source.

10. An integrated circuit comprising the current supply system according to claim 1.

11. A power supply system, comprising:

a voltage source configured to generate an output voltage between a first and a second output terminal of said voltage source, wherein said voltage source is configured to generate said output voltage as a function of a reference signal; and a current supply system according to claim 1.

12. The power supply system according to claim 11, comprising:

a plurality of strings of solid-state light sources, wherein each string of solid-state light sources is connected between a respective second terminal and said second output terminal of said voltage source.

* * * * *